(12) United States Patent
Toren et al.

(10) Patent No.: US 9,357,171 B2
(45) Date of Patent: *May 31, 2016

(54) SYSTEM AND METHOD OF MULTI-END-POINT DATA-CONFERENCING

(71) Applicant: ClearOne Communications Hong Kong Limited, Salt Lake City, UT (US)

(72) Inventors: Shai Toren, Tivon (IL); Tsur Arieli, Tsur Moshe (IL); Igor Rivkin, Ashkelon (IL)

(73) Assignee: ClearOne Communications Hong Kong Ltd., Hong Kong (HK)

(*) Notice: Subject to any disclaimer, the term of this patent is extended or adjusted under 35 U.S.C. 154(b) by 41 days.

This patent is subject to a terminal disclaimer.

(21) Appl. No.: 14/033,173

(22) Filed: Sep. 20, 2013

(65) Prior Publication Data

US 2014/0022335 A1    Jan. 23, 2014

Related U.S. Application Data

(63) Continuation of application No. 13/776,457, filed on Feb. 25, 2013, now abandoned, which is a continuation of application No. 12/817,300, filed on Jun. 17, 2010, now Pat. No. 8,437,282.

(60) Provisional application No. 61/218,952, filed on Jun. 21, 2009.

(51) Int. Cl.
*H04N 7/15* (2006.01)
*H04L 12/18* (2006.01)

(52) U.S. Cl.
CPC ............ *H04N 7/152* (2013.01); *H04L 12/1818* (2013.01)

(58) Field of Classification Search
CPC . H04L 12/18; H04L 12/1818; H04L 12/1822; H04L 12/1827; H04L 9/0805; H04L 9/0833; H04L 29/06414; H04L 65/403
USPC .......... 370/259–263, 265–271, 352; 709/204, 709/205, 220; 379/201.01, 202.01, 379/205.01–218.01
See application file for complete search history.

(56) References Cited

U.S. PATENT DOCUMENTS 5,524,110 A * 6/1996 Danneels .................. G06T 1/00
                                                                348/E7.082
5,737,010 A * 4/1998 Yachi ..................... H04N 7/152
                                                                348/14.09

(Continued)

*Primary Examiner* — Mohamed Kamara
(74) *Attorney, Agent, or Firm* — Matthew J. Booth & Associates PLLC; Matthew J. Booth

(57) ABSTRACT

A multi end-point (EP) conferencing system, including a decentralized scalable network of End-Points that includes a source EP being configured to connect to a non-virtual target EP. The source EP being configured to transmit to the non-virtual target EP a conference list thereof, for distributing to non-virtual EPs and virtual EPs associated with the target EP. It is further configured to receive a conference list of the non-virtual target EP, integrate the received conference list with its conference list to obtain an integrated conference list and distribute the integrated conference list or parts thereof to virtual EPs and non-virtual EPs associated with the source EP. The source EP being further configured to receive a positive selection notification being indicative of a requesting EP from EPs associated with the source EP that would like to get data from the source EP. In response to receipt of the positive selection notification, the source EP being configured to transmit data for receiving by the requesting EP.

27 Claims, 13 Drawing Sheets

(56) References Cited

U.S. PATENT DOCUMENTS

| | | | |
|---|---|---|---|
| 5,828,838 A | 10/1998 | Downs et al. | |
| 6,288,739 B1 | 9/2001 | Hales et al. | |
| 6,449,641 B1 | 9/2002 | Moiin et al. | |
| 7,130,883 B2 | 10/2006 | Zhu et al. | |
| 7,456,858 B2 | 11/2008 | Schrader et al. | |
| 7,554,571 B1 * | 6/2009 | Beck | H04N 7/147 348/14.07 |
| 7,593,032 B2 | 9/2009 | Civanlar et al. | |
| 8,437,282 B2 * | 5/2013 | Toren | H04L 12/1818 370/252 |
| 2003/0058805 A1 | 3/2003 | Meyerson et al. | |
| 2005/0010638 A1 * | 1/2005 | Richardson | H04L 12/185 709/204 |
| 2005/0024487 A1 | 2/2005 | Chen | |
| 2005/0063463 A1 | 3/2005 | Zhang et al. | |
| 2005/0207357 A1 * | 9/2005 | Koga | H04L 12/1813 370/260 |
| 2005/0256925 A1 | 11/2005 | Luo et al. | |
| 2009/0305688 A1 * | 12/2009 | Bonnet | H04L 12/1822 455/422.1 |
| 2012/0154516 A1 * | 6/2012 | Niu | H04N 7/147 348/14.09 |

* cited by examiner

Fig. 1D

| EP | IP Address | Bit rate | Frame rate | Codec | Video Frame Resolution | Virtual? | Associated with | In MC? | Out MC? | Requested Video Frame Resolution |
|---|---|---|---|---|---|---|---|---|---|---|
| 115C | 1.1.1.2 | BR1 | FR1 | C1 | VFR1 | N | | N | N | |
| 116C | 1.1.1.3 | BR2 | FR2 | C2 | VFR2 | N | | Y | Y | |
| 117C | 1.1.1.4 | BR3 | FR3 | C3 | VFR3 | Y | 116C | | | RVFR1 |

Fig. 1E

| | 112C | | | | 115C | | | | 116C | | | | 117C | | | |
|---|---|---|---|---|---|---|---|---|---|---|---|---|---|---|---|---|
| | UC count | MC count | MC address | MC port | UC count | MC count | MC address | MC port | UC count | MC count | MC address | MC port | UC count | MC count | MC address | MC port |
| 112C | 1 | 0 | | | 0 | 0 | | | 0 | 0 | | | 0 | 0 | | |
| 115C | 0 | 2 | x.x.x.x | y | 0 | 0 | | | 1 | 1 | x.x.x.x | z | 0 | 0 | | |
| 116C | 0 | 0 | | | 0 | 0 | | | 0 | 0 | | | 0 | 0 | | |
| 117C | 0 | 0 | | | 0 | 0 | | | 0 | 0 | | | 0 | 0 | | |

Fig. 1F

|  | 112C | | 115C | | 116C | | 117C | |
|---|---|---|---|---|---|---|---|---|
|  | UC? | MC? | UC? | MC? | UC? | MC? | UC? | MC? |
| 112C | Yes | No | | | | | | |
| 115C | No | No | | | | | | |
| 116C | No | Yes | | | | | | |
| 117C | Yes | Yes | | | | | | |

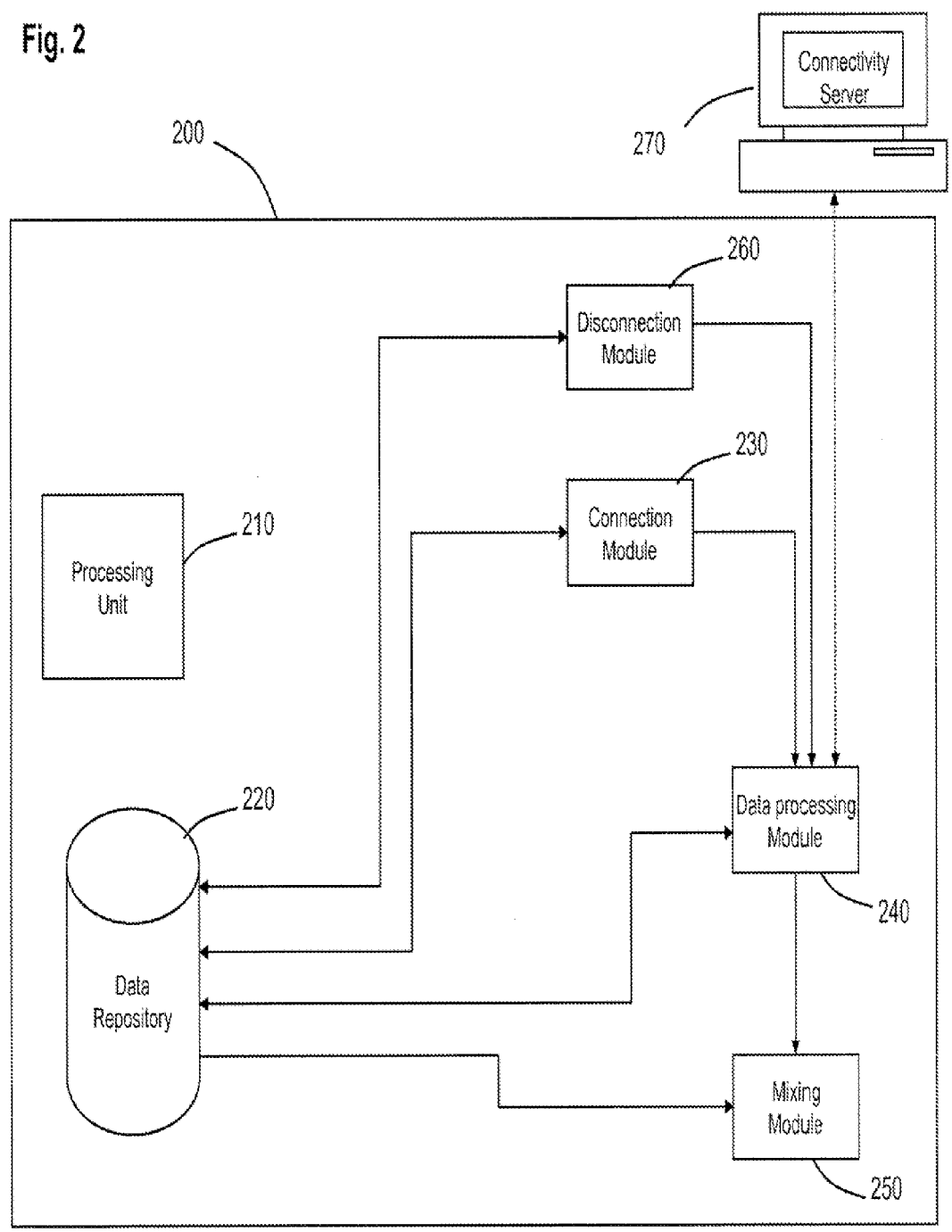

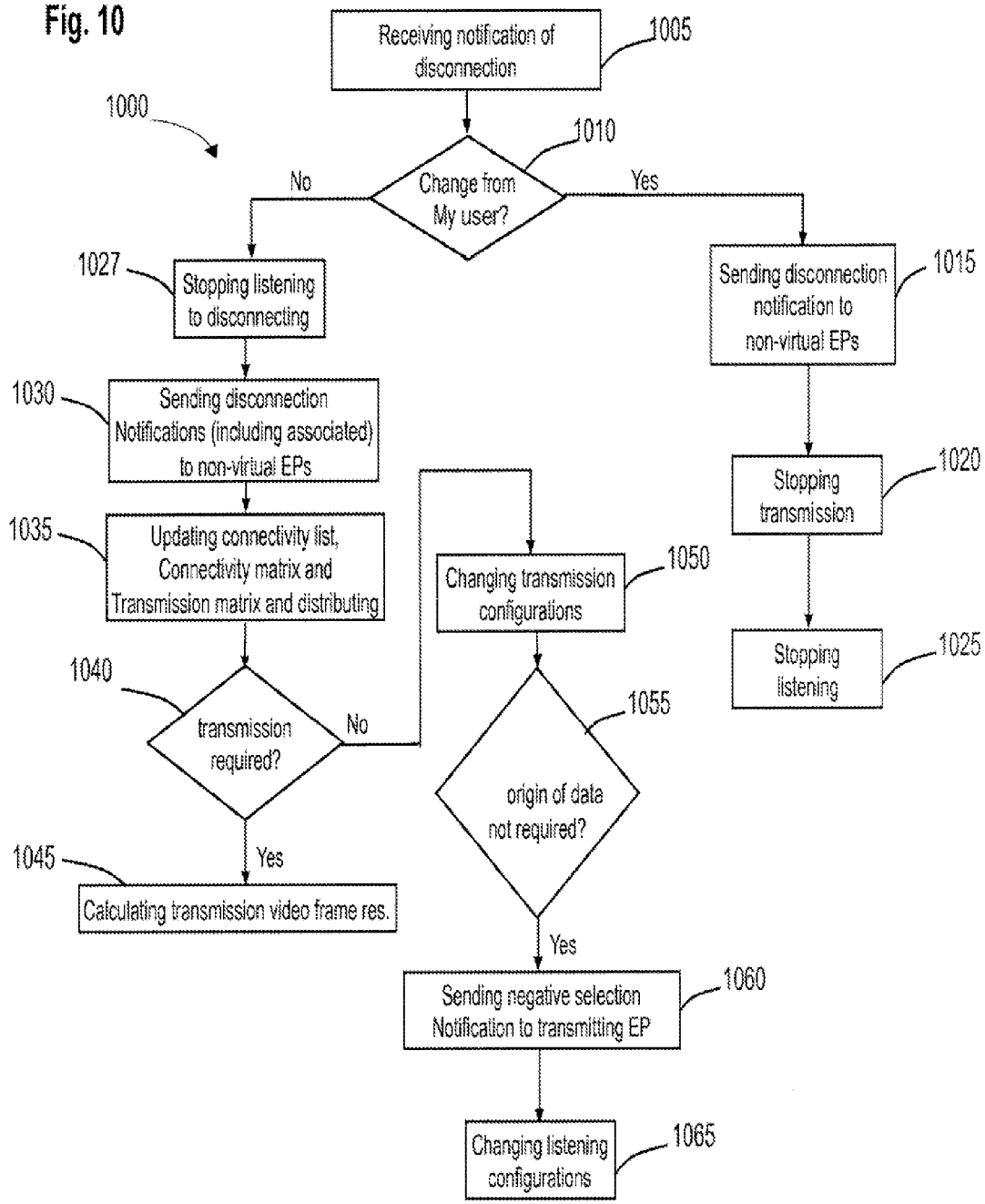

SYSTEM AND METHOD OF MULTI-END-POINT DATA-CONFERENCING

CROSS-REFERENCE TO RELATED APPLICATION

This application is a continuation of, and claims priority to, U.S. patent application Ser. No. 13/776,457, filed Feb. 25, 2013, now abandoned which claims priority to U.S. patent application Ser. No. 12/817,300, which Issued as U.S. Pat. No. 8,437,282 on May 7, 2013, which claims priority to U.S. Provisional Patent Application No. 61/218,952, filed Jun. 21, 2009, the disclosures of each of which are hereby incorporated by reference in their entirety.

TECHNICAL FIELD

This disclosure relates to the field of data conferencing.

BACKGROUND

Most data-conferencing systems utilize a central server for their operation. In such systems, the central server receives data from each transmitting end-point, decodes the received data, and, using the decoded received data and the users' selections, mixes, encodes and transmits data to each user according to his selections. Most data-conferencing systems therefore require relatively large resources of bandwidth and processing.

Thus, there is a need in the art for providing a new multi-endpoint (EP) data conferencing system and method.

Prior art references considered to be relevant as a background to the disclosure are listed below. Acknowledgement of the references herein is not to be inferred as meaning that these are in any way relevant to the patentability of embodiments of the invention disclosed herein.

U.S. Pat. No. 7,593,032 (Civanlar et al.) issued Sep. 22, 2009, discloses systems and methods for conducting a multi-endpoint video signal conference. Conferencing endpoints are linked by pairs of a reliable and a less reliable communication channel. Conference video signals are scaleable coded in base layer and enhancement layers format. Video signal base layers, which correspond to a minimum picture quality, are communicated over reliable channels. The video signal enhancements layers may be communicated over the less reliable channels. A conference server mediates the switching of video layer information from transmitting endpoints to receiving endpoints without any intermediate coding or re-coding operations. The video conference can be integrated with an audio conference using either scalable coded audio signals or non-scaleable coded audio signals.

US Patent application No. 2005/0063463 (Zhang et al.) published on Mar. 24, 2005 discloses a scalable layered video coding scheme that encodes video data frames into multiple layers, including a base layer of comparatively low quality video and multiple enhancement layers of increasingly higher quality video, adds error resilience to the enhancement layer. Unique resynchronization marks are inserted into the enhancement layer bitstream in headers associated with each video packet, headers associated with each bit plane, and headers associated with each video-of-plane (VOP) segment. Following transmission of the enhancement layer bitstream, the decoder tries to detect errors in the packets. Upon detection, the decoder seeks forward in the bitstream for the next known resynchronization mark. Once this mark is found, the decoder is able to begin decoding the next video packet. With the addition of many resynchronization marks within each frame, the decoder can recover very quickly and with minimal data loss in the event of a packet loss or channel error in the received enhancement layer bitstream. The video coding scheme also facilitates redundant encoding of header information from the higher-level VOP header down into lower level bit plane headers and video packet headers. Header extension codes are added to the bit plane and video packet headers to identify whether the redundant data is included US Patent application No. 2005/0024487 (Chen et al.) published on Feb. 3, 2005 discloses, in a video conference system in which multiple video codecs are simultaneously operating to transmit video, audio and other data between participants in real-time, sharing the system's available resources. This patent provides a way for each codec to adapt to changing network load conditions caused by, for example, participants (and hence codecs) joining/leaving the conference (system). To support video in this type of dynamic environment, the codec is designed for complexity and distortion control and is able to make intelligent tradeoffs between complexity, rate, and distortion. For complexity control, the codec monitors the available computational resources of the system during run-time and adapts its encoding/decoding algorithms to best match the complexity measurements. For distortion control, the codec overcomes the limitations of poor quality video at low bit-rates and allows the user to improve the quality of the video in select regions-of-interest.

The references cited in the background teach many principles of data-conferencing, Therefore the full contents of these publications are incorporated by reference herein for appropriate teachings of additional or alternative details, features and/or technical background.

U.S. Pat. No. 7,456,858 (Schrader, et al), issued Nov. 25, 2008, discloses a method and a device for conferencing network systems providing automatic generation and allocation of optimized setup of multiple end points (EP's) to multi site connection units (MCU's) in a distributed video conference system according to a weighting function. The patent relates to monitoring and administering distributed MCU's connected together and set up in a call in a distributed video conference system. By gathering and merging call information, the method and system is capable of sending a specific command to the MCU capable of executing the command.

SUMMARY

In accordance with a certain aspect of the invention there is provided a multi end-point (EP) conferencing system, comprising: a decentralized scalable network of End-Points comprising at least one source EP being configured to connect to a non-virtual target EP; the source EP being configured to transmit to the non-virtual target EP a conference list thereof, for distributing to non-virtual EPs and virtual EPs associated with the target EP, and is further configured to receive a conference list of the non-virtual target EP, integrate the received conference list with its conference list to obtain an integrated conference list and distribute the integrated conference list or parts thereof to virtual EPs and non-virtual EPs associated with the source EP; the source EP being configured to receive at least one positive selection notification being indicative of requesting EPs from EPs associated with the source EP that would like to get data from the source EP; in response to the at least one positive selection notification, the source EP being configured to transmit data for receiving by the at least one requesting EP.

In accordance with a certain embodiment of the invention, there is further provided a multi end-point (EP) conferencing system wherein at least one of the requesting EPs being a virtual EP.

In accordance with a certain embodiment of the invention there is still further provided a multi end-point (EP) conferencing system wherein the data includes at least one of video and audio data.

In accordance with a another embodiment of the invention, there is still further provided a multi end-point (EP) conferencing system wherein the conference list includes data indicative of all requesting EPs and in respect of each of the requesting EPs said conference list further includes indication of the requested transmitting data characteristics, and wherein the source EP is configured to transmit data dependent upon the characteristics.

In accordance with a particular embodiment of the invention, there is still further provided a multi end-point (EP) conferencing system wherein the data includes video data and wherein the characteristics include requested video frame resolution and wherein the video data is transmitted in a video frame resolution that complies with the following: transmitted video frame resolution=Min (video frame resolution of source EP video data, Max (video frame resolution requested by any of the requesting EPs)).

In accordance with a certain embodiment of the invention there is still further provided a multi end-point (EP) conferencing system wherein the source EP being configured to test the ability to communicate with the non virtual target EP using a multi-cast protocol.

In accordance with a certain embodiment of the invention there is still further provided a multi end-point (EP) conferencing system wherein the source EP is configured to halt transmissions of a data originating from an EP in the case that following receipt of a disconnection notification or a negative selection notification in respect of the EP no EP is to receive data from the source EP wherein the data originating from the EP.

In accordance with another aspect of the invention there is provided a multi end-point (EP) conferencing system, comprising:

a decentralized scalable network of End-Points comprising at least one source EP being configured to connect to a non-virtual target EP; the source EP being configured to transmit to the non-virtual target EP a conference list thereof, for distributing to non-virtual EPs and virtual EPs associated with the target EP, and is further configured to receive a conference list of the non-virtual target EP, integrate the received conference list with its conference list to obtain an integrated conference list and distribute the integrated conference list or parts thereof to virtual EPs and non-virtual EPs associated with the source EP; the source EP being configured to receive data originating from a positively selected EP including utilizing said integrated conference list for identifying at least one EP transmitting, using a multi-cast protocol, the data originating from the positively selected EP and receiving the data transmitted using the multi-cast protocol from the at least one identified EP; the source EP being configured to mix and output the received data, whereby the source EP forms part of a decentralized scalable EPs data conferencing system.

In accordance with another embodiment of the invention there is provided a multi end-point (EP) conferencing system according to claim 8 wherein the source EP being further configured to utilize the conference list for selecting an EP from among the at least one identified EPs utilizing a criterion of number of EPs receiving the data from the respective identified EP, such that the selected EP having the largest number of EPs receiving the data.

In accordance with yet another embodiment of the invention there is provided a multi end-point (EP) conferencing system wherein in the case that the utilizing the integrated conference list reveals that there is no identified EP that transmits, using the multi-cast protocol, the data or the data transmitted using the multi-cast protocol is not received by the source EP, then the source EP is configured to utilize the conference list for identifying a non-virtual EP which the positively selected EP is associated with, and transmitting to the non-virtual EP a positive selection notification for distributing to the positively selected EP; the source EP is further configured to receive data originating from the positively selected EP and is further being configured to mix and output the received data.

In accordance with yet another embodiment of the invention, there is provided a multi end-point (EP) conferencing system wherein the source EP being configured to receive data originating from the positively selected EP includes: the source EP being configured to receive at least one multi-cast IP address and port number of respective EP nodes that transmit data originating from the positively selected EP and receiving data using the multi-cast IP address and port number from one of the respective EP nodes.

In accordance with an alternative embodiment of the invention, there is provided a multi end-point (EP) conferencing system wherein the source EP being configured to receive data originating from the positively selected EP includes: the source EP being configured to receive data using a uni-cast protocol from a non virtual EP, wherein the data originated from the positively selected EP.

In accordance with still another aspect of the invention, there is provided a multi end-point (EP) conferencing system, comprising: a decentralized scalable network of End-Points (EP) comprising at least one EP being configured to connect to at least one non-virtual EP; for each given EP in the network, all EPs in the network other than non-virtual EPs thereof constitute virtual EPs of the given EP; a source EP in the network, being responsive to a command to receive data originating from a positively selected EP, is configured to utilize an integrated conference list for identifying at least one EP transmitting, using a multi-cast protocol, the data originating from the positively selected EP and receiving from the identified at least one EP the data transmitted using the multi-cast protocol; the source EP being configured to mix and output the received data; in the case that there is no such identified EP that transmits, using the multi-cast protocol, the data or the data transmitted using the multi-cast protocol is not received by the source EP, the source EP being configured to utilize the conference list for identifying a non-virtual EP which the positively selected EP is associated with and transmitting to the non-virtual EP a positive selection notification for distributing to the positively selected EP; in response to receiving the positive selection notification by the positively selected EP, the positively selected EP and at least one intermediate EP are configured to distribute the data to the source EP in a decentralized fashion, including: the positively selected EP is configured, in response of receiving the positive notification, to utilize the connectivity list for identifying the non-virtual intermediate EP which the positively selected EP is associated with and in the case that the intermediate non-virtual EP is capable of receiving transmissions using the multi-cast protocol from the positively selected EP, the positively selected EP is configured to transmit the data using the multi-cast protocol and to send to the intermediate non-virtual EP a multi-cast IP address and port number utilized by the positively selected EP for transmitting the data, alternatively if the intermediate non-virtual EP is incapable of receiving transmissions using the multi-cast protocol from the positively selected EP, the positively selected EP is configured to transmit the data to the intermediate non-virtual EP using a uni-cast protocol; each intermediate EP from among the at least one intermediate EP receiving the data, is configured to utilize the connectivity list for identifying a target intermediate non virtual EP which the source EP is associated with and in the case that the target intermediate non-virtual EP is capable of receiving transmissions using the multi-cast protocol from the intermediate EP, the intermediate EP is configured to transmit the data using the multi-cast protocol and to send to the target intermediate non-virtual EP a multi-cast IP address and port number utilized by the intermediate EP for transmitting the data and all multi-cast IP addresses and port numbers received by intermediate and positively selected EPs that transmitted the data using the multi-cast protocol; alternatively, if the target intermediate non-virtual EP is incapable of receiving transmissions using the multi-cast protocol from the intermediate EP, the intermediate EP is configured to transmit the data to the non-virtual intermediate EP using a uni-cast protocol and to send to the target intermediate non-virtual EP all multi-cast IP addresses and port numbers received by the intermediate and positively selected EPs that transmitted the data using the multi-cast protocol; the source EP being configured to receive the data and to mix and output the received data.

In accordance with still another aspect of the invention, there is provided a method for transmitting data in a multi-endpoint (EP) conferencing system, comprising: connecting to a non-virtual target EP; transmitting to the non-virtual target EP a conference list, for distributing to non-virtual EPs and virtual EPs associated with the target EP; receiving a conference list of the non-virtual target EP; integrating the received conference list with the conference list to obtain an integrated conference list; distributing the integrated conference list or parts thereof to associated virtual EPs and non-virtual EPs; receiving at least one positive selection notification being indicative of requesting EPs from associated EPs that would like to get data; transmitting data for receiving by the at least one requesting EP.

In accordance with a particular embodiment of the invention, there is provided a method of the kind specified wherein at least one of said requesting EPs being a virtual EP.

In accordance with another embodiment of the invention, there is provided a method of the kind specified wherein the data includes at least one of video and audio data.

In accordance with yet another embodiment of the invention, there is provided a method of the kind specified wherein said conference list includes data indicative of all requesting EPs and in respect of each of said requesting EPs said conference list further includes indication of the requested transmitting data characteristics, and wherein said transmitting data is dependent upon said characteristics.

In accordance with a particular embodiment of the invention, there is provided a method of the kind specified wherein said data includes video data and wherein said characteristics include requested video frame resolution and wherein said transmitting includes calculating transmitting video frame resolution that complies with the following: transmitted video frame resolution=Min (video frame resolution of source EP video data, Max (video frame resolution requested by any of said requesting EPs)) and transmitting said data in said calculated resolution.

In accordance with another embodiment of the invention, there is provided a method of the kind specified wherein said connecting includes testing the ability to communicate with said non virtual target EP using a multi-cast protocol.

In accordance with yet another embodiment of the invention, there is provided a method of the kind specified wherein said transmitting is halted in the case that following receipt of a disconnection notification or a negative selection notification in respect of an EP no requesting EPs exist.

In accordance with still another aspect of the invention, there is provided a method for transmitting and/or receiving data in a multi-endpoint (EP) conferencing system, comprising: connecting to a non-virtual target EP; transmitting to said non-virtual target EP a conference list, for distributing to non-virtual EPs and virtual EPs associated with said target EP; receiving a conference list of said non-virtual target EP; integrating said received conference list with the conference list to obtain an integrated conference list; distributing said integrated conference list or parts thereof to associated virtual EPs and non-virtual EPs; receiving data originating from a positively selected EP including utilizing said integrated conference list for identifying at least one EP transmitting, using a multi-cast protocol, the data originating from said positively selected EP; receiving said data transmitted, using said multi-cast protocol, from the at least one identified EP; mixing and outputting said received data, whereby forming part of a decentralized scalable EPs data conferencing system.

In accordance with another embodiment of the invention, there is provided a method of the kind specified wherein said receiving said data further includes utilizing said conference list for selecting an EP from among said at least one identified EPs utilizing a criterion of number of EPs receiving said data from the respective identified EP, such that said selected EP having the largest number of EPs receiving said data.

In accordance with yet another embodiment of the invention, there is provided a method of the kind specified wherein said receiving data further includes in the case that said utilizing the integrated conference list reveals that there is no identified EP that transmits, using said multi-cast protocol, said data or said data transmitted using said multi-cast protocol is not received by said source EP, utilizing said conference list for identifying a non-virtual EP which the positively selected EP is associated with, and transmitting to said non-virtual EP a positive selection notification for distributing to said positively selected EP; and wherein said receiving data further includes receiving data originating from said positively selected EP and mixing and outputting said received data.

In accordance with an alternative embodiment of the invention, there is provided a method of the kind specified wherein said receiving data further includes receiving at least one multi-cast IP address and port number of respective EP nodes that transmit data originating from said positively selected EP and receiving data using said multi-cast IP address and port number from one of said respective EP nodes.

In accordance with yet another embodiment of the invention, there is provided a method of the kind specified wherein said receiving data further includes receiving data using a uni-cast protocol from a non-virtual EP, wherein said data originated from said positively selected EP.

In accordance with still another aspect of the invention, there is provided a method for transmitting and/or receiving data in a multi-endpoint (EP) conferencing system, comprising: a decentralized scalable network of End-Points (EP) including at least one EP being configured to connect to at least one non-virtual EP; for each given EP in the network, all EPs in the network other than non-virtual EPs thereof constitute virtual EPs of said given EP, the method comprising: operating a source EP in response to a command to receive data originating from a positively selected EP, including: utilizing an integrated conference list for identifying at least one EP transmitting, using a multi-cast protocol, the data originating from said positively selected EP; receiving from said identified at least one EP said data transmitted using said multi-cast protocol; mixing and outputting said received data; In case that there is no such identified EP that transmits, using said multi-cast protocol, said data or said data transmitted using said multi-cast protocol is not received by said source EP, utilizing said conference list for identifying a non-virtual EP which the positively selected EP is associated with; transmitting to said non-virtual EP a positive selection notification for distributing to said positively selected EP; operating said positively selected EP including: in response to receiving said positive selection notification utilizing said connectivity list for identifying a non-virtual intermediate EP which said positively selected EP is associated with; in the case that said intermediate non-virtual EP is capable of receiving transmissions using said multi-cast protocol from said positively selected EP, transmitting said data using said multi-cast protocol and sending to said intermediate non-virtual EP a multi-cast IP address and port number utilized for transmitting said data; alternatively if said intermediate non-virtual EP is incapable of receiving transmissions using said multi-cast protocol from said positively selected EP, transmitting said data to said intermediate non-virtual EP using a uni-cast protocol; operating at least one intermediate EP for distributing said data from said positively selected EP to said source EP in a decentralized fashion, including: in response to receiving said data, utilizing said connectivity list for identifying a target intermediate non virtual EP which said source EP is associated with; in the case that said target intermediate non-virtual EP is capable of receiving transmissions using said multi-cast protocol from said at least one intermediate EP, transmitting said data using said multi-cast protocol and sending to said target intermediate non-virtual EP a multi-cast IP address and port number utilized by said at least one intermediate EP for transmitting said data and all multi-cast IP addresses and port numbers received by said at least one intermediate and positively selected EPs that transmitted said data using said multi-cast protocol; alternatively, if said target intermediate non-virtual EP is incapable of receiving transmissions using said multi-cast protocol from said at least one intermediate EP, transmitting said data to said non-virtual intermediate EP using a uni-cast protocol and sending to said target intermediate non-virtual EP all multi-cast IP addresses and port numbers received by said at least one intermediate and positively selected EPs that transmitted said data using said multi-cast protocol; operating said source EP for receiving said data and mixing and outputting said received data.

In accordance with another aspect of the invention, there is provided a source End-Point (EP) in a multi end-point (EP) conferencing system, comprising: a connection module being configured to provide: a source connectivity list that includes data indicative of all non virtual EPs, if any, and all virtual EPs, if any, associated with said source EP; a connectivity matrix that includes data indicative of the data transmissions between all non virtual EPs, if any, and all virtual EPs, if any, associated with said source EP; a transmission matrix that includes data indicative of all data transmission from said source EP, their origins and their destinations; the connection module being configured to connect to a non virtual target EP and exchange connectivity lists and connectivity matrixes thereby updating the source connectivity list to include data indicative of all non virtual EPs, if any, and all virtual EPs, if any, associated with said target EP and updating the connectivity matrix to include data indicative of the data transmissions between all non virtual EPs, if any, and all virtual EPs, if any, associated with said source EP; a data processing module being configured to transmit data to at least one requesting EP, said data being transmitted directly to said requesting EP or to an intermediate EP through which data is transferred to the requesting EP; said data processing module being configured to transmit a positive selection notification to at least one transmitting EP and further being configured to receive data originating from the at least one selected transmitting EP; a mixing module being configured to mix and output said received data, whereby said source EP forms part of a decentralized scalable EPs data conferencing system; said data processing module being configured to update the connectivity matrix and the transmission matrix responsive to at least one of received positive selection notification or transmitted positive selection notification; said processing module being configured to distribute said updated connectivity matrix or portions thereof and is further configured to distribute an updated connectivity matrix or portion thereof received from an EP associated with said source EP.

In accordance with another aspect of the invention, there is provided a computer program product configured to transmitting data, the computer program product includes a storage to store computer code for performing at least the follows: connecting to a non-virtual target EP; transmitting to said non-virtual target EP a conference list, for distributing to non-virtual EPs and virtual EPs associated with said target EP; receiving a conference list of said non-virtual target EP; integrating said received conference list with the conference list to obtain an integrated conference list; distributing said integrated conference list or parts thereof to associated virtual EPs and non-virtual EPs; receiving at least one positive selection notification being indicative of requesting EPs from associated EPs that would like to get data; transmitting data for receiving by said at least one requesting EP.

In accordance with yet another aspect of the invention, there is provided a computer program product configured to transmitting and/or receiving data, the computer program product includes a storage to store computer code for performing at least the follows: connecting to a non-virtual target EP; transmitting to said non-virtual target EP a conference list, for distributing to non-virtual EPs and virtual EPs associated with said target EP; receiving a conference list of said non-virtual target EP; integrating said received conference list with the conference list to obtain an integrated conference list; distributing said integrated conference list or parts thereof to associated virtual EPs and non-virtual EPs; receiving data originating from a positively selected EP including utilizing said integrated conference list for identifying at least one EP transmitting, using a multi-cast protocol, the data originating from said positively selected EP; receiving said data transmitted, using said multi-cast protocol, from the at least one identified EP; mixing and outputting said received data, whereby forming part of a decentralized scalable EPs data conferencing system.

BRIEF DESCRIPTION OF THE DRAWINGS

In order to understand the invention and to see how it may be carried out in practice, certain embodiments will now be described, by way of non-limiting examples only, with reference to the accompanying drawings, in which:

FIG. 1D is an example of a connectivity list, in accordance with certain embodiments of the invention;

FIG. 1E is an example of a connectivity matrix, in accordance with certain embodiments of the invention;

FIG. 1F is an example of a transmission matrix, in accordance with certain embodiments of the invention;

FIG. 2 is a block diagram of an end-point of a multi end-point data-conferencing system for managing a data-conference, in accordance with certain embodiments of the invention;

FIG. 10 is a flowchart illustrating a sequence of operations of a process for disconnecting from a data-conference, in accordance with certain embodiments of the invention;

DETAILED DESCRIPTION OF EMBODIMENTS OF THE INVENTION

Figure 1A:
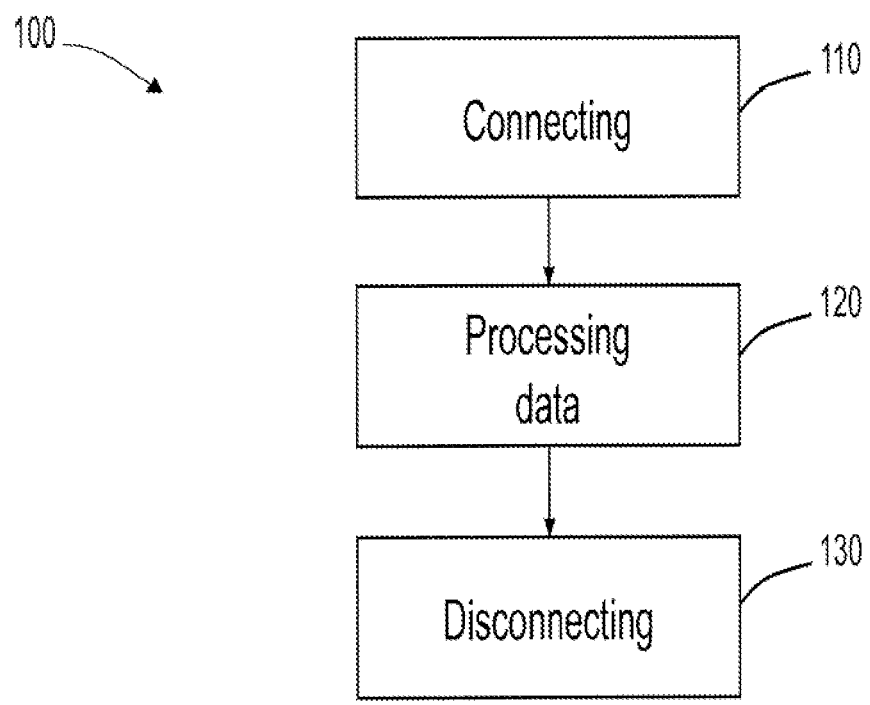
FIG. 1A is a flowchart illustrating a high-level sequence of operations carried out for managing a data-conference, in accordance with certain embodiments of the invention.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention. In the drawings and descriptions, identical reference numerals indicate those components that are common to different embodiments or configurations.

Unless specifically stated otherwise, as apparent from the following discussions, it is appreciated that throughout the specification discussions utilizing terms such as "processing", "calculating", "setting", "configuring", "connecting", "transmitting", "streaming", "utilizing", "storing", "receiving", "distributing", "updating", "mixing", "outputting", "exchanging", "propagating", "providing" or the like, refer to the action and/or processes of a computer that manipulate and/or transform data into other data, said data represented as physical quantities, e.g. such as electronic quantities, and/or said data representing the physical objects. The term "computer" should be expansively construed to cover any kind of electronic device with data processing capabilities, including, by way of non-limiting example, a personal computer, a server, a computing system, a communication device, a processor (e.g. digital signal processor (DSP), a microcontroller, a field programmable gate array (FPGA), an application specific integrated circuit (ASIC), etc.), any other electronic computing device, and or any combination thereof.

The operations in accordance with the teachings herein may be performed by a computer specially constructed for the desired purposes or by a general purpose computer specially configured for the desired purpose by a computer program stored in a computer readable storage medium.

In addition, embodiments of the present invention are not described with reference to any particular programming language. It will be appreciated that a variety of programming languages may be used to implement the teachings of the inventions as described herein.

As used herein, the phrase "for example," "such as", "for instance" and variants thereof describe non-limiting embodiments of the present invention. Reference in the specification to "one embodiment", "an embodiment", "some embodiments", "other embodiments", "certain embodiments", or variants thereof means that a particular feature, structure or characteristic described in connection with the embodiment(s) is included in at least one embodiment of the invention. Thus the appearance of the phrase "one embodiment", "an embodiment", "some embodiments", "other embodiments", "certain embodiments" or variants thereof does not necessarily refer to the same embodiment(s).

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

In embodiments of the invention, fewer, more and/or different stages than those shown in FIG. 1A, 3-10 may be executed. In embodiments of the invention one or more stages illustrated in FIG. 1A, 3-10 may be executed in a different order and/or one or more groups of stages may be executed simultaneously. FIG. 2 illustrates a general schematic of the system architecture in accordance with an embodiment of the invention. Each module in FIG. 2 can be made up of any combination of software, hardware and/or firmware that performs the functions as defined and explained herein. The modules in FIG. 2 may be centralized in one location or dispersed over more than one location. In other embodiments of the invention, the system may comprise fewer, more, and/or different modules than those shown in FIG. 2.

Unless defined otherwise, all technical and scientific terms used herein have the same meaning as commonly understood by one of ordinary skill in the art to which this invention belongs. Generally (although not necessarily), the nomenclature used herein described below is well known and commonly employed in the art. Unless described otherwise, conventional methods are used, such as those provided in the art and various general references.

Turning to a detailed description of embodiments of the invention, FIG. 1A is a flowchart illustrating a high-level sequence of operations carried out for managing a data-conference, in accordance with certain embodiments of the invention. In the first stage of process 100, upon a user's wish to initiate a new data-conference or join an existing data-conference, the user establishes a connection between his end-point (hereinafter: "Source EP" e.g. 111B in FIG. 1B) and a desired target end-point (Hereinafter: "Target EP" e.g. 112B in FIG. 1B), e.g. by dialing to the Target EP, etc. (step 110). For that purpose, the source EP is configured to receive input indicative of a target EP from a user and establish a connection to the target EP. The connection may be realized by any communication means, for example via wired or wireless communication. It is to be noted that other methods of connection establishment may also be utilized.

Following the establishment of a connection, in certain embodiments the source and target End-Points (hereinafter: "EP") are configured to exchange data (forming part of the connection step 110) of a connectivity list that each EP is configured to maintain. The connectivity list includes, inter alia, data indicative of all EPs that are connected to the EP that maintains the connectivity list, either directly (hereinafter: "Non-virtual EP"), if any, or indirectly (hereinafter: "Virtual EP"), if any. A direct connection is a connection between a source EP and a target EP, established as described above (e.g. by dialing from a source EP to a target EP). Thus, each directly connected EP is a non-virtual EP for the EP it is connected to, and vice versa. Thus, for example, with reference to FIG. 1B, EP 112B is connected to non virtual EP 111B and vice versa. An indirect (Virtual) connection is a connection between EPs that were not directly connected, e.g. a connection between a source EP and EPs that are connected to a directly connected EP or EPs that are connected to the EPs that are connected to the EPs that are connected to the directly connected EP and so on. Accordingly, each EP that is not directly connected to a specific EP is a virtual EP for that specific EP. Thus with reference to exemplary FIG. 1C, the following EPs: 112C, 113C and 114C, are non virtual EPs that are associated with source EP 111C, whereas the following EPs: 115C, 116C and 117C, are virtual EPs that are associated with source EP 111C. The connectivity list may include also data indicating if a certain EP is virtual or non-virtual (column 156). In addition, the connectivity list may include data indicative of the IP address of each EP (column 151).

Figure 1B:
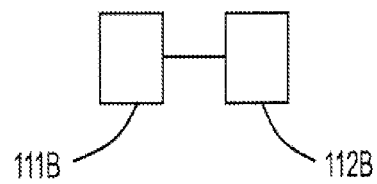
FIG. 1B illustrates a simplified illustration of connected EPs, in accordance with certain embodiments of the invention.

For a better understanding of the connectivity list exchange step, attention is reverted to FIG. 1B. Before connecting to non virtual EP 112B the connectivity list of EP 111B is empty (since it is a standalone EP) and the same holds true for EP 112B (before connection is made to EP 111 B). After exchanging the respective empty connectivity lists, they are updated to include data indicative on the fact that EP 111B is connected to EP 112B (for the connectivity list associated with EP 111B) and that EP 112B is connected to EP 111B (for the connectivity list associated with EP 112B), and thus integrated connectivity lists are created.

Figure 1C:
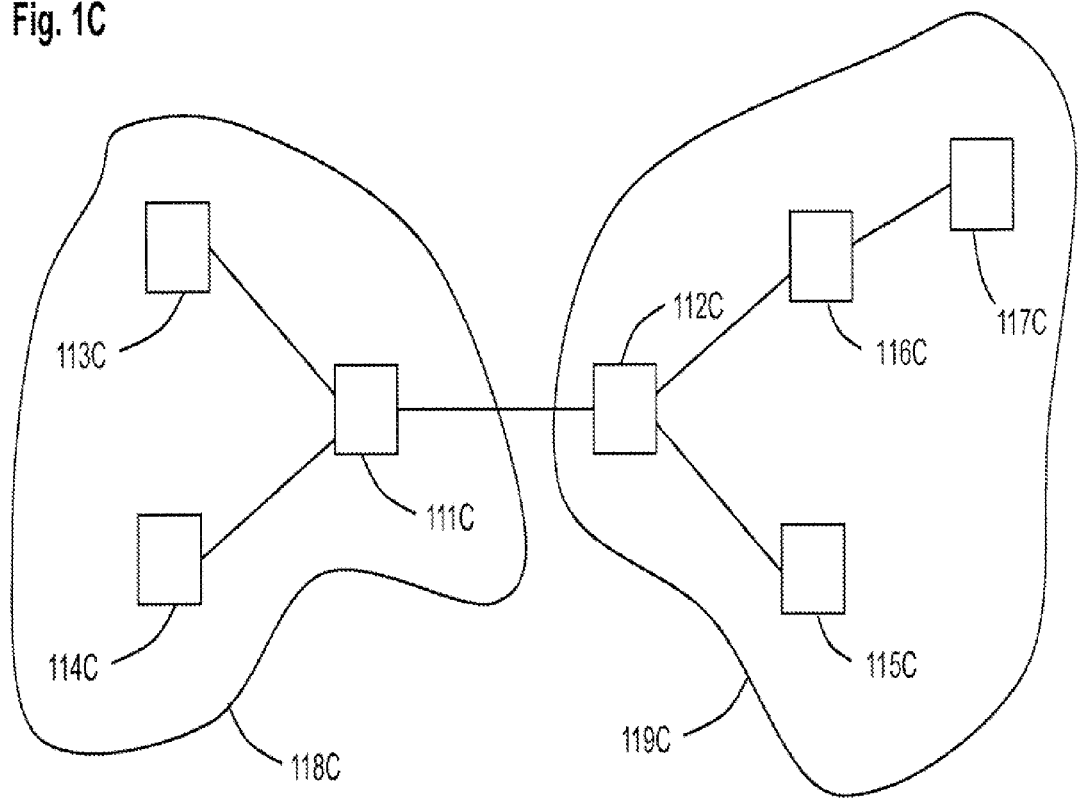
FIG. 1C illustrates another simplified illustration of connected EPs, in accordance with certain embodiments of the invention.

Tuning now to FIG. 1C, assuming, for sake of discussion, that before EP 111C dials to EP 112C clusters 118C and 119C are already active. In other words, there is an active data-conference involving EPs 111C, 113C and 114C where the connectivity list associated with EP 111C includes data indicating that it is connected to non virtual EPs 113C and 114C. There is another active distinct conference call involving EPs 112C, 115C, 116C and 117C, where the connectivity list associated with EP 112C before the connectivity list exchange with EP 111C, shown in FIG. 1D, includes data indicating, as can be seen, that it is connected to non virtual EPs 116C and 115C and to a virtual EP 117C (left column entitled "EP" 150).

Bearing this in mind, when EP 111B connects to EP 112B they exchange and update their respective connectivity lists in order to create integrated connectivity lists. Thus, after EP 111C receives the connectivity list of EP 112C, it updates the list to include the following data: EP 112C is added as a non virtual EP whereas all the EPs connected to EP 112C (115C, 116C and 117C—whether non virtual or virtual) become virtual connected EPs with respect to EP 111C. The reason that they all become virtual EPs is that EPs 115C, 116C and 117C are all indirectly connoted to EP 111C, as readily shown in FIG. 1C. In some embodiments, for each virtual EP, an indication of the non-virtual EP from which the connectivity list data originated from will be added, for example, referring to FIG. 1C, and FIG. 1D, an indication that EP 117C is associated with the non-virtual EP 116C is maintained in the connectivity list of EP 112C (column 157).

Similarly, the connectivity list of EP 112C is updated to include non virtual EP 111C and virtual EPs 113C and 114C (both with an indication that they are associated with EP 111C in column 157). Note that the integrated connectivity list (or portions thereof) of 112C (or possibly the connectivity list of EP 111 C) is further distributed and appropriate update is performed by each EP. Thus, for instance, EP 116C updates its connectivity list (which originally designates EPs 112C and 117C as non virtual EPs and EP 115C as virtual EP), to designate EPs 111C, 113C and 114C as virtual EPs (with an indication that they are associated with EP 112C in column 157).

The connectivity list may include other data as well (as will be exemplified in greater detail below), and it is not bound to any specific data structure (e.g. a list, an array, a tree, etc.), nor to a single data-repository (e.g. the connectivity list may be spread over a few databases, etc.).

Reverting now to FIG. 1A and as has been demonstrated with reference to FIGS. 1B and 1C, upon receipt of the connectivity list, the EPs are configured to update the connectivity lists maintained by them accordingly and distribute the integrated connectivity list (or portions thereof, for example, only the updated records) to all non-virtual EPs connected to them. Each receiving non-virtual EP gets updates to the connectivity list and then updates its pre-stored connectivity list and distributes the integrated connectivity list (or portions thereof) to all of the non-virtual EPs connected thereto (where the latter update their respective connectivity lists) and so forth, until all associated EPs (virtual and non-virtual) receive and update their connectivity list accordingly (this distribution method forms an example of a: "connectivity distribution method"). It is to be noted that other distribution methods may be utilized in order to distribute the connectivity list. It is also to be noted that in some embodiments, the EPs may be configured to distribute the entire connectivity list after it has been updated whereas in other embodiments the EPs may be configured to distribute only the updates to the connectivity list themselves.

It is also to be noted that in certain embodiments, the connectivity list may be managed, saved and distributed, partly or entirely, by a centralized server (hereinafter: "connectivity server"), thus duplication of the connectivity list as it is managed, saved and distributed by each EP can be avoided. The data transmission in such embodiments remains decentralized as it is performed by each EP independently, as the audio and/or video transmission does not involve any central server. It is also to be noted that in certain embodiments any one of the EPs may function as a logical connectivity server.

In some embodiments, the system may be configured to utilize a multi-cast protocol for transmitting and/or receiving data, as further described below. In such embodiments, the connection step 110 may further include performing of a multi-cast ability test during the introduction stage. In the multi-cast ability test, the source and target EPs ability to transmit data to one another and to receive data from one another using the multi-cast protocol, is tested, as further described with reference to FIG. 3, below.

In addition to the connectivity list exchange, in certain embodiments the source and target EPs are further configured to exchange data (also forming part of the connection step 110) of a general connectivity matrix (hereinafter: "connectivity matrix") that each EP may be further configured to maintain. The connectivity matrix contains, inter alia, data about each EP's transmissions of data originating from every EP connected to the data-conference, either by utilizing the uni-cast protocol or the multi-cast protocol. The connectivity matrix further contains the multi-cast IP address and port utilized for transmitting the data (for cases where the multi-cast protocol is utilized to transmit data originating from a certain EP,). FIG. 1E is an example of a connectivity matrix, wherein for each EP (column 170), for each EP connected to the data-conference (row 171, hereinafter: "transmitted EP") a uni-cast counter (column 172) indicates how many EPs receive uni-cast transmissions of data originating from the transmitted EP from this EP, a multi-cast counter (column 173) indicates how many EPs receive multi-cast transmissions of data originating from the transmitted EP from this EP, a multi-cast address (column 174) indicates the multi-cast IP address utilized for multicasting and a multi-cast port (column 175) indicates which port number is utilized for transmitting data originating from the transmitted EP. It is to be noted that any updates to the connectivity matrix may also be distributed using the connectivity distribution method. It is also to be noted that in some embodiments, the EPs may be configured to distribute the integrated connectivity matrix after it has been updated whereas in other embodiments the EPs may be configured to distribute only the updates to the connectivity matrix themselves. Additionally, according to certain embodiments, the connectivity matrix may be managed, saved and distributed, partly or entirely, by the connectivity server, thus duplication of the connectivity matrix as it is managed, saved and distributed by each EP can be avoided. The data transmission in such embodiments remains decentralized as it is performed by each EP independently, as the audio and/or video transmission does not involve any central server.

In addition to the connectivity list and connectivity matrix, each EP may be further configured to maintain a personal transmission matrix (hereinafter: "transmission matrix"). The transmission matrix contains, inter alia, indications if the maintaining EP transmits data originating from a transmitting EP to any other EP using the multi-cast protocol or the uni-cast protocol. FIG. 1F is an example of a transmission matrix, wherein for each EP (column 180), for each EP connected to the data-conference (row 181, hereinafter: "transmitted EP") uni-cast column (column 182) indicates if the maintaining EP transmits data originating from a transmitting EP using the uni-cast protocol to the EP of column 180 and multi-cast column (column 183) indicates if the maintaining EP transmits data originating from a transmitting EP using the multi-cast protocol to the EP of column 180.

It is to be noted that the connectivity list, the connectivity matrix and the transmission matrix are all examples of a conference list. Such a conference list can be arranged in another manner and include additional and/or different data. The separation to those three data structures is done in an exemplary manner and other and/or different data structures can be used. In order to simplify the description, the invention will be described with reference to those three examples (i.e. the connectivity list, the connectivity matrix and the transmission matrix) in an exemplary non-limiting manner When reference is made to utilization of the conference list, the utilization can be, for example, of one or more parts of one or more of the three examples (i.e. the connectivity list, the connectivity matrix and the transmission matrix).

Having connected (including exchanging and updating connectivity lists and connectivity matrixes) there follows a processing data step 120. This will be further discussed with reference to FIGS. 5 to 10, below. As will be explained in greater detail below, in the processing data step, the system is configured to dynamically configure the data-conference. For this purpose, in certain embodiments, the system is configured to receive at least one user positive selection notification indicative of EP(s) from which the user wishes to receive data or user negative selection notification indicative of EP(s) from which the user wishes to stop receiving data (said data can be for example audio and/or video data). Upon receipt of a positive selection notification, the system may be configured, inter alia, to select an EP from which the requested data is to be received, and update the connectivity matrix and the transmission matrix accordingly, as further described below with respect to FIG. 5.

In certain embodiments, the connectivity matrix (or portions thereof) is distributed to all non-virtual and virtual EPs using, for example, the specified connectivity distribution method (as mentioned above, in alternative embodiments the connectivity matrix in its entirety may be distributed).

In certain embodiments, upon receipt of an update notification (either positive or negative selection notification), each EP may be configured to check if any operative actions are to be taken by it following receipt of updates to its connectivity matrix. Such operative actions may be, for example, to start or stop listening to a multi-cast IP address and a specific port, to start or stop transmitting audio and/or video, etc. If such operative actions are required, the system is configured to perform the required operative actions, and to update the connectivity matrix and the transmission matrix accordingly as further described with reference to FIG. 5. It is to be noted that such user selections may be made throughout the data-conference, at any given time.

As further discussed below, in certain embodiments, a source EP transmits data only if a positive selection notification is received from at least one other EP indicative that the latter wants to receive data (e.g. audio and/or video data) from the source EP according to its transmission matrix. In accordance with certain embodiments, video data may be transmitted in a calculated resolution as further described with reference to FIG. 8 below. As described above, the system is configured to receive at least one user's selection notification indicative of EP(s) from which the user wishes to receive or stop receiving audio and/or video data. The system is therefore further configured to receive at least data originating from the at least one selected EP(s) from which the user wishes to receive audio and/or video data. In certain embodiments, each EP according to certain embodiments has the ability to mix and output the data received by it. The outputting of the received data may be to a display which by way of example displays the data received from various transmitting EPs in respective segments of a split screen, where each segment displays video data that is received from a given transmitting EP. Optionally another segment will display the video data of the source EP. Thus for example, with reference to FIG. 1C, assuming that EP 111C has received a positive selection notification from EP 117C (signifying that EP 117C requests to receive data from EP 111C) and further that EP 111C sent a positive selection notification to EP 117C and 113C (signifying that it requests to receive video data from these EPs), then the mixing of the received data may be performed such that the display associated with EP 111C may be split to three segments—one showing the video data originating from EP 111C (transmitted to EPC 117C) and the other two segments showing the video data receives from respective EPs 117C and 113C. The pertinent received and/or transmitted audio data (if any) may be sent to speakers associated with the EP.

Note that the invention is not bound by any given mixing and or outputting technique. Thus for example Each EP receives data according to the user selection (if any), and mixes the data according to a user selected layout and other system parameters (e.g. bit rate, frame rate, resolution, etc.).

The system is further configured to disconnect an EP from the data-conference (step 130), for example, upon a user's request. In certain embodiments, when a disconnection is performed, a disconnection notification is distributed to all associated EPs, if any, using, for example, the connectivity distribution method. Each receiving EP, if any, removes the disconnecting EP and all of its associated EPs (both the non-virtual and virtual EPs of the disconnecting EP) from the connectivity list, the connectivity matrix and the transmission matrix and checks if any operative actions are to be taken by it. Such operative actions may be, inter alia, to stop listening to a multi-cast IP address and a specific port, to stop transmitting audio and/or video data, etc. If such operative actions are required, the system is configured to perform the required operative actions as further described with reference to FIG. 10.

It is accordingly appreciated that in accordance with certain embodiments each EP operates autonomously such that the entire system operation is decentralized. Those versed in the art will further appreciate that in accordance with certain embodiments the system is of scalable nature in that practically an EP can select one or more virtual EPs to connect to and be connected with many such virtual EPs and not bound by physical constraints of a central server such as maximal allowed ports, etc. Such scalability cannot be achieved when utilizing a central server (which by nature has a limited amount of available ports) for managing the data transmissions into the system.

FIG. 2 is a block diagram of an end-point of a multi end-point data-conferencing system for managing a data-conference, in accordance with certain embodiments of the invention. EP 200 includes at least one processing unit 210, configured to manage, control and execute the various EP 200 modules and operations. EP 200 further includes a data repository 220, for storing, updating and retrieving various data, including, inter alia, the connectivity list, connectivity matrix and transmission matrix described above. EP 200 further includes a connection module 230, a data processing module 240, a mixing module 250 and a disconnection module 260. It is to be noted that EP 200 may comprise fewer, more, and/or different modules than those logical modules (e.g. the connection module may be divided into a first module to manage and store the connectivity list and the connectivity matrix and a second module to distributing the connectivity list and the connectivity matrix, etc.).

According to certain embodiments, connection module 230 is configured to receive data indicative of a desired target EP from a user and establish a connection between a source EP and the requested target EP accordingly, as described above with reference to step 110 of FIG. 1. Connection module 230 is further configured to provide the connectivity list and the connectivity matrix saved in data repository 220 or alternatively, for example, in connectivity server 270. Connection module 230 is further configured to perform the exchange and update of the connectivity lists and matrixes (which may be saved for example in data repository 220), and distribute them (or portions thereof) as described above with reference to FIG. 1.

In certain embodiments, connection module 230 is further configured to perform a multi-cast ability test, in which the source and target EPs ability to transmit data and to receive data using the multi-cast protocol is tested, as further described with reference to FIG. 4.

In some embodiments, connection module 230 may be configured to utilize data processing module 240 for purposes of sending and receiving data to and from a target EP.

In some embodiments, data processing module 240 of a given EP being responsive to a user command (through known per se user user-interface, not shown), for determining the receiving and transmitting EPs, that are associated with the specified given EP. In certain embodiments, data processing module 240 may be configured to perform any required updates to data in data repository 220 according to such user commands (for example, update the transmission matrix and the connectivity matrix and/or the connectivity list saved in data repository 220).

According to certain embodiments, data processing module 240 is further configured to process the actual transmissions of data (e.g. video and/or audio data) between the participants of a conference according to the user(s) selection(s) (for example as indicated by the transmission matrix and the connectivity matrix and/or the connectivity list saved in data repository 220) as will be further described below with reference to FIGS. 5 to 10.

It is to be noted that in some embodiments, for example when a connectivity server 270 is introduced into the system, data processing module 240 may be further configured to communicate selection notifications and other data relevant to the connectivity list and/or the connectivity matrix to connectivity server 270 and receive data regarding the connectivity list and/or the connectivity matrix from the connectivity server 270.

According to certain embodiments, mixing module 250 is configured to mix and output data received by EP 200, as further described with reference to step 120 of FIG. 1. In some embodiments, mixing module 250 may utilize data from data repository 220 (for example, the user selected layout, etc.) and from data processing module 240 (for example data received from transmitting EPs) for those purposes.

According to certain embodiments, disconnection module 260 is configured to perform a disconnection process, as will be further discussed with reference to FIG. 10 below. In some embodiments, disconnection module 260 may be configured to update data repository 220 (for example delete disconnecting users from the connectivity list, connectivity matrix and transmission matrix saved in data repository 220). Disconnection module 260 may also be configured to transmit a disconnection notification to non-virtual EPs using, for example, data processing module 240.

Figure 3:
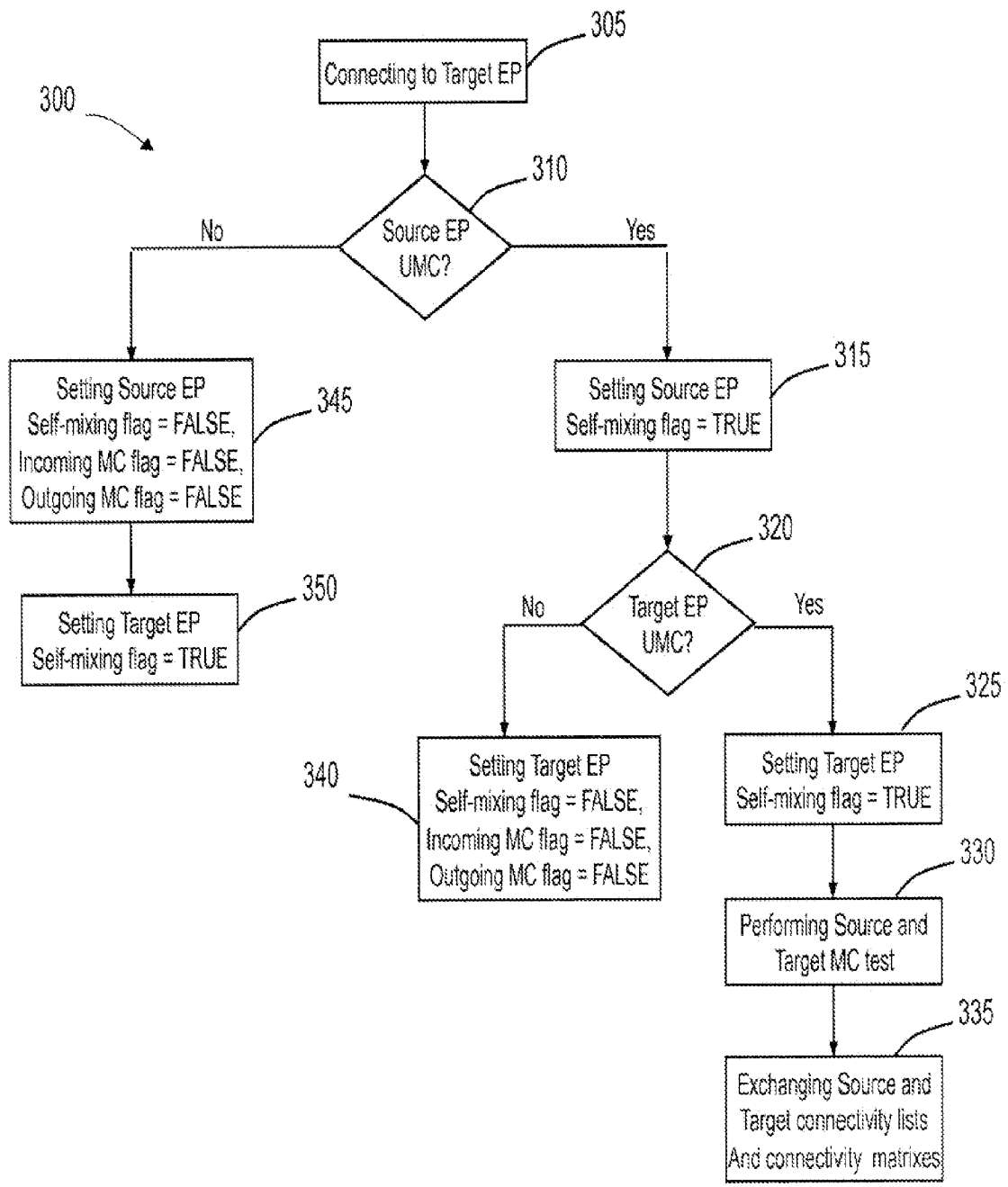
FIG. 3 is a flowchart illustrating a sequence of operation carried out for connecting to a data-conference and performing an introduction stage, in accordance with certain embodiments of the invention.

FIG. 3 illustrates a sequence of operations carried out for connecting to a data-conference and performing an introduction stage, in accordance with certain embodiments of the invention. At the first stage of process 300, a source EP user establishes a connection between his end-point and a desired target EP, e.g. by dialing to the target EP, etc. (step 305). The system may be further configured to check if the source EP is of the type of the present invention (hereinafter: "UMC EP") (step 310). If the source EP is a UMC EP, the system is configured to set a flag indicative of the fact that the source EP is capable of performing self-mixing of data sent to it (step 315), as described with reference to FIG. 2. Following setting of the self-mixing flag, the system may be further configured to check if the target EP is a UMC EP (step 320). If so, the system is configured to set a flag indicative of the fact that the target EP is capable of performing self-mixing of data sent to it (step 325). In case both EPs are UMC EPs, source and target EPs are further configured to perform a multi-cast ability test (step 330), as further described with reference to FIG. 4. Source and target EPs are also configured to exchange their connectivity lists and connectivity matrixes (step 335), as described with reference to FIG. 1A.

It is to be noted that the system may be further configured to enable connecting a non-UMC EP (hereinafter: "Legacy EP") to a UMC EP (and vice versa). Returning to FIG. 3, in case the target EP is a legacy EP, the system is configured to set a flag indicative of the fact that the target EP is incapable of performing self-mixing of data sent to it and additional flags indicative of the fact that the target EP is incapable of receiving and transmitting data using the multi-cast protocol (step 340). In case the source EP is a legacy EP, the system is configured to set a flag indicative of the fact that the source EP is incapable of performing self-mixing of data sent to it and additional flags indicative of the fact that the source EP is incapable of receiving and transmitting data using the multi-cast protocol (step 345). In such cases, the system is further configured to set a flag indicative of the fact that the target EP is capable of performing self-mixing of data sent to it (step 350), since at least one of the source and target EPs is a UMC EP according to the invention.

When a legacy EP is connected to a data-conference, as either the source or the target EP, the legacy EP can be connected to only one non-virtual EP. In such embodiments, the UMC EP may be configured to perform the mixing and encoding of audio and/or video transmissions, for example according to the decision of the UMC EP user, and to transmit the data to the legacy EP in the legacy EP data format. The UMC EP may be further configured to decode audio and/or video transmissions received from the legacy EP and transmit it if any user positively selected to receive data originating from its non-virtual legacy EP. Thus, in certain embodiments, the legacy EP receives data transmissions in a format suitable to its operation, and the UMC EP is capable of receiving transmissions in a legacy EP format. It is to be noted that in other embodiments, a legacy EP may be capable of utilizing the multi-cast protocol, and appropriate modifications to the system may be performed.

Figure 4:
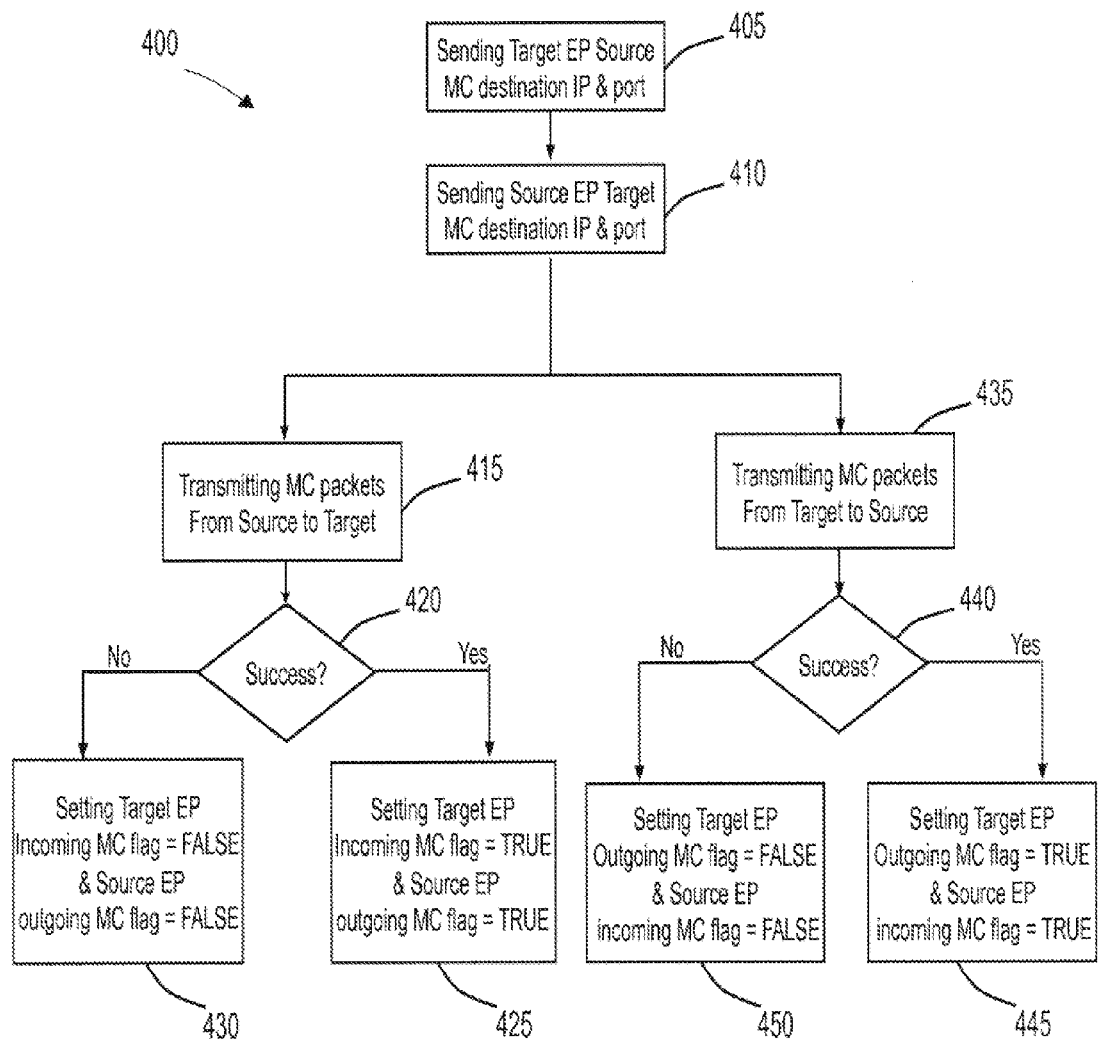
FIG. 4 is a flowchart illustrating a sequence of operation carried out for testing Multi-cast ability of Source and Target EPs, in accordance with certain embodiments of the invention.

Turning now to FIG. 4, it illustrates a flowchart illustrating a sequence of operation carried out for testing Multi-cast ability of Source and Target EPs (both being UMC EPs), in accordance with certain embodiments of the invention. In certain embodiments, after establishment of a connection between a source EP and a target EP, the system performs a multi-cast ability test process 400, for testing the ability of the source and target to exchange data while utilizing the multi-cast protocol. For that purpose, the source EP is configured to provide the target EP with a multi-cast IP address and a specific port for multi-casting data (step 405). The target EP is configured to provide the source EP with a multi-cast IP address and a specific port number for multi-casting data (step 410). Following the exchange of multi-cast IP addresses and port numbers for multi-casting data between the source and target EPs, the source EP transmits data to the multi-cast IP address and port it provided to the target EP, using the multi-cast protocol (step 415). The target EP listens to the multi-cast IP address and port provided to it by the source EP for multi-cast purposes (step 420). In case the data sent from the source EP arrives at the target EP, the target EP sends a receipt notification to the source EP. Such notification may be sent, for example, using the uni-cast protocol directly to the source EP, while utilizing the connection established between the source and target EPs at the connection stage. If a receipt notification arrives at the source EP, the source EP sets a flag indicating that it is capable of transmitting data to the target EP while utilizing the multi-cast protocol and that the target EP is capable of receiving data from it by utilizing the multi-cast protocol (step 425). If no receipt of notification arrives after a pre-defined waiting period (for example 0.5 seconds), the source EP sets a flag indicating that it is incapable of transmitting data to the target EP while utilizing the multi-cast protocol and that the target EP is incapable of receiving data from it by utilizing the multi-cast protocol (step 430). In parallel, the target EP transmits data to the multi-cast IP address and port received from the source EP, using the multi-cast protocol (step 435). The source EP listens to the multi-cast IP address and port provided to it by the target EP for multi-cast purposes (step 440). In case the data sent from the target EP arrives at the source EP, the source EP sends a receipt notification to the target EP. Such notification may be sent, for example, using the uni-cast protocol directly to the target EP, while utilizing the connection established between the source and target EPs at the connection stage. If a receipt notification arrives at the target EP, the target EP sets a flag indicating that it is capable of transmitting data to the source EP while utilizing the multi-cast protocol and that the source EP is capable of receiving data from it by utilizing the multi-cast protocol (step 445). If no receipt of notification arrives after a pre-defined waiting period (for example 0.5 seconds), the target EP sets a flag indicating that it is incapable of transmitting data to the source EP while utilizing the multi-cast protocol and that the source EP is incapable of receiving data from it by utilizing the multi-cast protocol (step 450).

The above described multi-cast ability flags may be saved, for example, as part of the connectivity list. For example, the connectivity list associated with EP 112C before the connectivity list exchange with EP 111C, shown in FIG. 1D, includes data indicating as can be seen, that it is capable of receiving multi-cast transmissions from its non-virtual EP 116C (column 158 entitled "In MC?") and that EP it is capable of transmitting multi-cast transmissions to its non-virtual EP 116C (column 159 entitled "Out MC?"). It is to be noted that as any person of ordinary skill in the art can appreciate, other methods of testing the multi-cast ability between the source and target EPs may be implemented. Note that the invention is not bound by the specified multi-cast testing sequences described with reference to FIG. 4.

Figure 5:
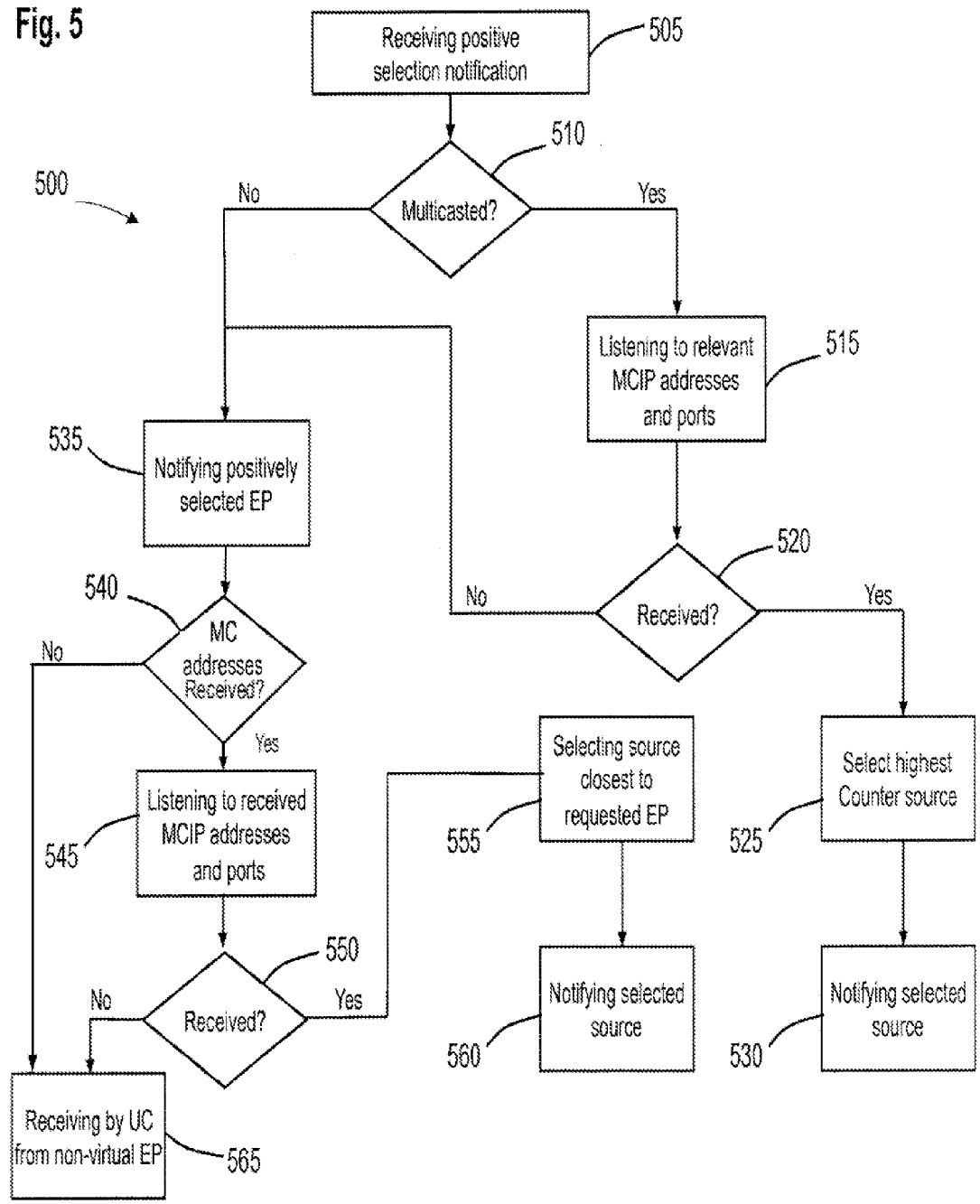
FIG. 5 is a flowchart illustrating a sequence of operations carried out for updating the data characteristics of the data-conference following receipt of a positive selection notification, in accordance with certain embodiments of the invention.

Turning now to FIG. 5, it illustrates a flowchart of a sequence of operations carried out for updating the data characteristics of the data-conference following receipt of a positive selection notification, in accordance with certain embodiments of the invention. In certain embodiments, process 500 begins when an EP receives a positive selection notification from its user (or alternatively from another user, for example if another EP user is able to choose to positively select for other EPs, etc.) (step 505). The EP that received the positive selection notification is hereinafter referred to also as: "requesting EP". The requesting EP checks, e.g. by means of data processing module 240, if a multi-cast transmission of data originating from the positively selected EP exists, as, for example, another EP already positively selected the same positively selected EP and data is sent to it using the multi-cast protocol (step 510). An indication of the fact that a multi-cast transmission of data originating from the positively selected EP exists can be found in the connectivity matrix, as the values in the column entitled MC count for the positively selected EP will be greater than 0 for each EP that transmits data originating from the positively selected EP (when looking at FIG. 1E, if the positively selected EP is EP 112C, which is labeled 176, then the relevant column is column 173, and an example of a multi-cast greater than 0 is in the row associated with EP 115C for which the MC count equals 2, meaning that it is transmitting data originating from EP 112C to 2 EPs using the multi-cast protocol). It is to be noted that, as further described below, the MC counter indicates how many EPs receive data originating from a certain origin EP through or from a specific EP.

When looking at FIG. 1E again, assuming that EP 117C positively selected to receive data originating from EP 112C, it can be seen that EP 115C already transmits data originating from the positively selected EP to two other EPs, as its associated MC counter=2. The connectivity matrix further contains the multi-cast IP address and port number utilized for transmitting data originating from the positively selected EP (column 174 and 175 in FIG. 1E). Thus, returning to the example in which EP 117C positively selected to receive data originating from EP 112C, it can be seen that EP 115C utilizes the multi-cast IP address "x.x.x.x" and port number "y" for transmitting data originating from EP 112C.

In case a multi-cast transmission of data originating from the positively selected EP exists, the requesting EP retrieves the relevant multi-cast IP addresses and port numbers from the connectivity matrix and begins listening to the retrieved multi-cast IP addresses and ports for a predetermined time period (step 515). The predetermined period may be, for example, 0.5 seconds, as transmission arrival times between different EPs vary from different reasons (e.g. different distances between EPs). The requesting EP checks if transmission of data originating from the positively selected EP is received (step 520). If the requesting EP receives transmission of data originating from the positively selected EP from at least one EP, the requesting EP retrieves the MC counters of the EPs from which transmission of data originating from the positively selected EP arrived from, compares them and selects to receive the data from the EP associated with the highest value counter (step 525).

The reason for selecting to receive the data from the EP associated with the highest value counter is to save bandwidth, as the probability that EPs associated with lower value counters may stop transmitting data originating from the positively selected EP is higher, since as the counters become zeroed (from reasons that will be further detailed below, with reference to FIGS. 7 and 10), transmissions of data originating from EPs associated with the zeroed counters are ceased.

Following selection of the EP from which data originating from the positively selected EP is to be received from, an appropriate notification is sent to it (step 530). In some embodiments, such notification may be sent to it through the EP it is associated with (according to the connectivity table, column 157), which in turn sends the notification to the EP through the EP it is associated with (according to the connectivity table, column 157), and so on, until the notification is received by an EP that is non-virtual to the EP from which data originating from the positively selected EP is to be received from—which directly sends the notification to the EP from which data originating from the positively selected EP is to be received from. It is to be noted that the data originating from the positively selected EP may be received by the requesting EP from a non-virtual EP associated with it and in such cases the notification will be directly sent to it. This method of notification is hereinafter referred to as "notification method".

Upon receipt of a notification, the EP from which data originating from the positively selected EP is to be received from increases the MC counter associated with it for the positively selected EP in the connectivity matrix by 1. Returning to the example in which EP 117C positively selects to receive data originating from EP 112C, and assuming that EP 115C is selected as the EP from which data originating from the positively selected EP is to be received from, EP 115C will receive the notification and increase its multi-cast counter associated with EP 112C by 1 so that the new MC counter value will be 3. Following such update of the connectivity matrix, the EP from which data originating from the positively selected EP is to be received from distributes the updated connectivity matrix by utilizing, for example, the connectivity distribution method.

In addition to updating the connectivity matrix, the EP from which data originating from the positively selected EP is to be received from updates his transmission matrix to indicate that it is transmitting data originating from the positively selected EP to the requesting EP by utilizing the multi-cast protocol. Looking at FIG. 1F, and assuming again that EP 115C transmits data originating from EP 112C to EP 117C, EP 115C will update its transmission matrix shown in FIG. 1F to indicate that it is transmitting data originating from EP 112C to EP 117C using the multi-cast protocol, as can be seen where the intersection of column 181 (entitled "MC?") within column 180 (entitled "112C" which is the positively selected EP) with row 182 (entitled "117C" which is the requesting EP) indicates so (it is to be noted that the indication may be numeral, Boolean, text or any other indication).

In certain embodiments, the EP from which data originating from the positively selected EP is to be received from may be further configured to calculate the required video resolution for the video transmission, as further described with reference to FIG. 8.

In case no multi-cast transmission of data originating from the positively selected EP exists or no transmission of data originating from the positively selected EP is received while listening to relevant multi-cast IP addresses and ports, the requesting EP may be configured to notify the positively selected EP that it was selected (step 535). Such notification is sent using the notification method, as described above. Looking at FIG. 1C, assuming that EP 111C selects to receive audio and/or video data from EP 117C and no multi-cast transmission of data originating from EP 117C exists or no transmission of data originating from EP 117C is received while listening to the relevant multi-cast IP addresses and ports, EP 111C notifies EP 112C (through which EP 117C is associated with EP 111C) of the positive selection of EP 117C by it. EP 112C then notifies EP 116C (through which EP 117C is associated with EP 112C) of the positive selection of EP 117C by EP 111C. EP 116C then notifies its non-virtual EP 117C of its positive selection by EP 111C.

Upon receipt of the notification, the positively selected EP checks if it is capable of transmitting data using the multi-cast protocol to the non-virtual EP from which he received the notification (as the notification is sent using the notification method, the notification is received from a non-virtual EP through which the receiving EP is associated with the positively selected EP), while utilizing its outgoing multi-cast flag for that non-virtual EP, which is a part of the connectivity list as explained above. If the positively selected EP is capable of multi-casting to the non-virtual EP from which he received the notification, it begins multi-casting, provides the non-virtual EP from which he received the notification (an intermediate EP) with the multi-cast IP address and port number and increases the multi-cast counter associated with him for the non-virtual EP from which he received the notification in the connectivity matrix by 1 (it is to be noted that in other embodiments, other EPs can be provided with the multi-cast IP address and port number for distributing them to the requesting EP). In addition to updating the connectivity matrix, the positively selected EP updates his transmission matrix to indicate that it is transmitting data originating from it to the non-virtual EP from which he received the notification by utilizing the multi-cast protocol. The non-virtual EP from which the positively selected EP received the notification begins listening to the received multi-cast IP address and port number.

If the positively selected EP is incapable of multi-casting to the non-virtual EP from which he received the notification, it begins transmission using the uni-cast protocol to the non-virtual EP from which he received the notification (for example while utilizing his IP address from the connectivity list, column 151) and increases the uni-cast counter associated with him for the non-virtual EP from which he received the notification in the connectivity matrix by 1. In addition to updating the connectivity matrix, the positively selected EP updates his transmission matrix to indicate that it is transmitting data originating from it to the non-virtual EP from which he received the notification by utilizing the uni-cast protocol.

Figure 6:
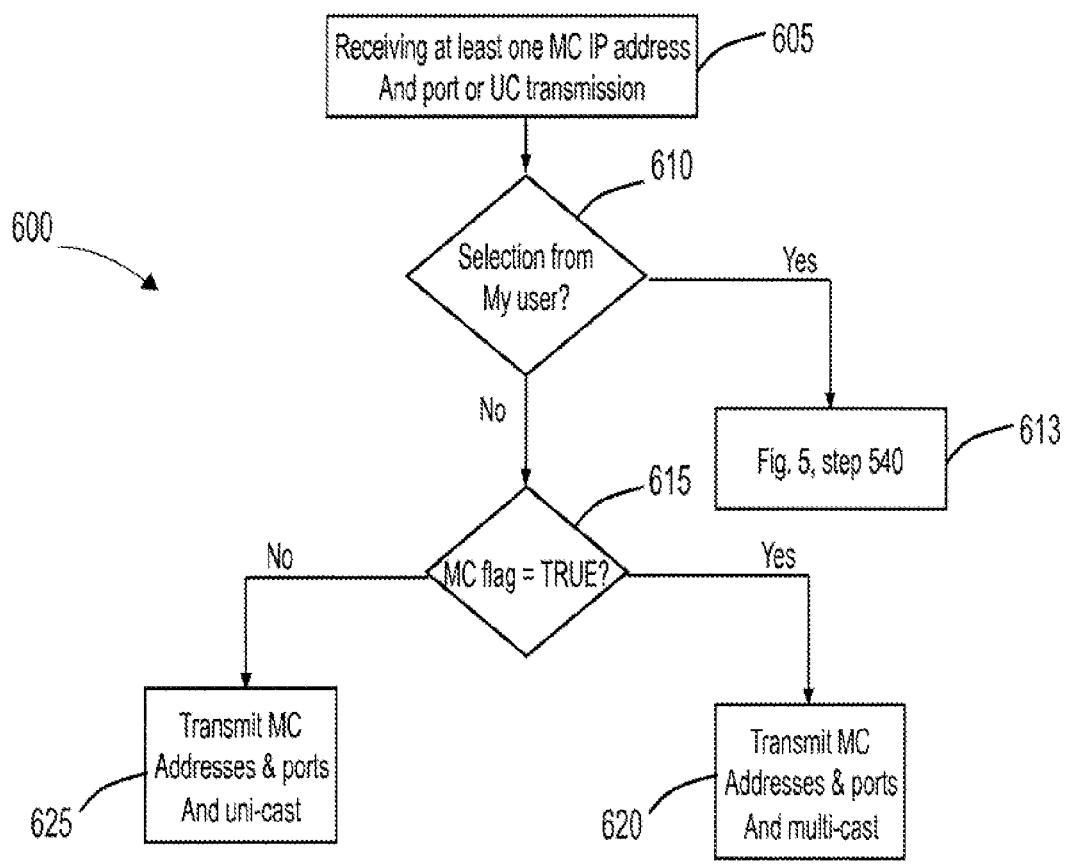
FIG. 6 is a flowchart illustrating a sequence of operations carried out for providing an EP with sources to receive data originating from a positively selected EP from, in accordance with certain embodiments of the invention.

Following receipt of at least one multi-cast IP address and port number or a uni-cast transmission by an EP, a new process, illustrated in FIG. 6, begins. Turning to FIG. 6, it illustrates a flowchart of a sequence of operations carried out for providing an EP with sources to receive data originating from a positively selected EP from, in accordance with certain embodiments of the invention. Process 600 begins as following receipt of at least one multi-cast IP address and port number or a uni-cast transmission (step 605), the non-virtual EP that received the at least one multi-cast IP address and port number or the uni-cast transmission checks if the positive selection originated from its user, or that it is the requesting EP (for example when another user, e.g. an administrator, is capable of issuing a positive selection notification on behalf of other EPs) (step 610). If so, the system is configured to proceed to step 540 of FIG. 5 (step 613). If the positive selection did not originate from its user and it is not the requesting EP (meaning that it is intermediating between the positively selected EP and the requesting EP (hereinafter: "intermediating EP")), it is configured to check if it is capable of transmitting data using the multi-cast protocol to the non-virtual EP through which the requesting EP is associated with (the EP that intermediates between it and the requesting EP, also referred to as: "target non-virtual intermediate EP") (step 615). If it is capable of doing so, it begins (or continues if it is already doing so) transmitting data using the multi-cast protocol (and increases the multi-cast counter associated with him for the EP through which the requesting EP is associated with in the connectivity matrix by 1) and provides the target non-virtual intermediate EP, with any multi-cast IP addresses and ports provided to it (for example while maintaining their receipt order—from the closest to the positively selected EP to the requesting EP) along with its own multi-cast IP address and port number (step 620). In addition to updating the connectivity matrix, the intermediating EP updates its transmission matrix to indicate that it is transmitting data originating from it to the target non-virtual intermediate EP by utilizing the multi-cast protocol.

If it is incapable of transmitting data using the multi-cast protocol to the target non-virtual intermediate EP, it provides the target non-virtual intermediate EP with any multi-cast IP addresses and port numbers provided to it (while maintaining their order—from the closest to the positively selected EP to the requesting EP), begins transmitting using the uni-cast protocol to the target non-virtual intermediate EP and increases the uni-cast counter associated with him for the target non-virtual intermediate EP in the connectivity matrix by 1 (step 625). In addition to updating the connectivity matrix, the intermediate EP updates his transmission matrix to indicate that it is transmitting data originating from it to the target non-virtual intermediate EP by utilizing the uni-cast protocol.

Returning to FIG. 5, upon receipt of the list of multi-cast IP addresses and ports (step 540) the requesting EP begins listening to them for a predetermined period of time (step 545). The predetermined period may be, for example, 0.5 seconds, as transmission arrival times between different EPs vary from different reasons (e.g. different distances between EPs). The requesting EP checks if transmission of data originating from the positively selected EP is received using the multi-cast protocol (step 550). If the requesting EP receives transmission of data originating from the positively selected EP from at least one EP, the requesting EP selects the EP closest to the positively selected EP (if possible—the positively selected EP itself), for example according to the receiving order of the multi-cast IP addresses and port numbers (step 555) and notifies the EP from which data originating from the positively selected EP is to be received from (hereinafter: "selected intermediate EP") using the above mentioned notification method (step 560).

Upon receipt of a notification, the selected intermediate EP increases the MC counter associated with him for the positively selected EP in the connectivity matrix by 1. Following such update of the connectivity matrix, the selected intermediate EP distributes the updated connectivity matrix by utilizing, for example, the connectivity distribution method.

In addition to updating the connectivity matrix, the selected intermediate EP updates his transmission matrix to indicate that it is transmitting data originating from the positively selected EP to the requesting EP by utilizing the multi-cast protocol.

In certain embodiments, the positively selected EP may be configured to calculate the required video resolution for the video transmission, as further described with reference to FIG. 8. For this purpose, it is to be noted that the requesting EP sends the positively selected EP a notification of the video frame resolution in which it wishes to receive video transmissions using the notification method. The positively selected EP updates its connectivity list (FIG. 1D, column 160 entitled "requested video frame resolution") accordingly.

Each EP that receives the notification of the identity of the selected intermediate EP (which is transmitted in the notification method) except the selected intermediate EP itself, is configured to initiate the process of receiving a negative selection notification in respect of the requesting EP to the EP from which it receives the data originating from the positively selected EP, as further described below with reference to FIG. 7.

If no transmission of data originating from the positively selected EP is received using the multi-cast protocol, the data will be received using the uni-cast protocol from the EP through which the positively selected EP is connected to the receiving EP (step 565).

Note that the invention is not bound by the operational steps of FIG. 6.

Figure 7:
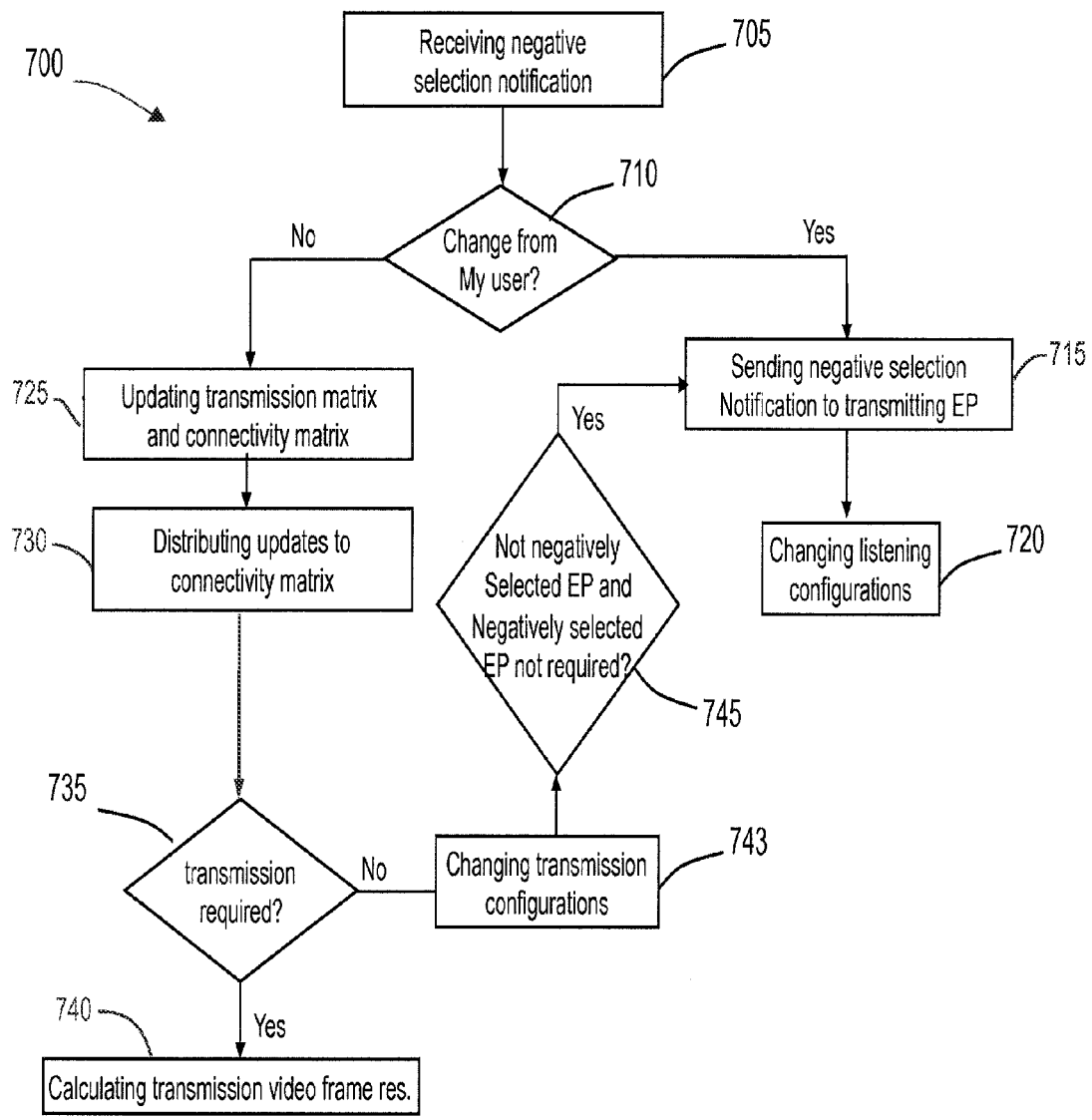
FIG. 7 is a flowchart illustrating a sequence of operations carried out for updating the data characteristics of the data-conference following receipt of a negative selection notification, in accordance with certain embodiments of the invention.

FIG. 7 is a flowchart illustrating a sequence of operations carried out for updating the data characteristics of the data-conference following receipt of a negative selection notification, in accordance with certain embodiments of the invention. According to certain embodiments, process 700 begins when a negative selection notification is received by an EP (step 705). The EP that received the negative selection notification is hereinafter also referred to as "negating EP". The negating EP is configured to check if the negative selection notification originated from its own user (or alternatively from another user, for example if another EP user is able to choose to negatively select for other EPs, etc.) (step 710), and in such case—to send a negative selection notification to the selected intermediate EP (step 715). In addition, the EP may be configured to change its listening configurations (step 720), as listening to the IP address and port number through which data originating from the negatively selected EP is received from may be unnecessary as data originating from the negatively selected EP is no longer required for example by the EP from which the negative selection notification originated from.

If the negative selection notification did not originate from the receiving EP user, the EP that received the negative selection notification may be configured to query its connectivity matrix to see if it is transmitting data originating from the negatively selected EP to the EP from which he received the negative selection notification using the multi-cast protocol or the uni-cast protocol. According to the query results, the EP that received the negative selection notification updates its transmission matrix to indicate that it is no longer transmitting data originating from the negatively selected EP to the EP from which he received the negative selection notification. In addition to updating the transmission matrix, The EP that received the negative selection notification decreases the respective counter within the connectivity matrix. Thus, if it transmitted data originating from the negatively selected EP to the EP from which he received the negative selection notification utilizing the multi-cast protocol—the MC counter, shown for example on FIG. 1E in column 173, will be decreased by 1. If however it transmitted data originating from the negatively selected EP to the EP from which he received the negative selection notification utilizing the uni-cast protocol—the UC counter, shown for example on FIG. 1E in column 172, will be decreased by 1). Both updates—to the connectivity matrix and to the transmission matrix are performed on step 725. Following update of the connectivity matrix, the EP is configured to distribute the updates to the connectivity matrix using, for example, the connectivity distribution method (step 730).

In addition to the connectivity matrix updates distribution, the system is further configured to check if following the update to the connectivity matrix, no counter became zeroed, so that further transmission of data originating from the negatively selected EP is required (step 735). If so—a calculation of the required video frame resolution is performed, as further detailed with reference to FIG. 8 (step 740). If however, any counter became zeroed, meaning that no EP is to receive data originating from the negatively selected EP from the EP that received the negative selection notification utilizing either the uni-cast protocol (in case a UC counter became zeroed) or the multi-cast protocol (in case a MC counter became zeroed), the EP that received the negative selection notification stops any transmission of data originating from the negatively selected EP using the uni-cast protocol or the multi-cast protocol, accordingly (step 743). If the EP that received the negative selection notification is the negatively selected EP the process ends. If however, the EP that received the negative selection notification is not the negatively selected EP, the EP that received the negative selection notification is configured to check if there is a need for it to continue receiving data transmissions originating from the negatively selected EP. Such a need exists if the EP that received the negative selection notification still transmits data originating from the negatively selected EP to at least one other EP, or, if the user of the EP that received the negative selection notification itself chose to receive video and/or audio data transmissions from the negatively selected EP. If the EP that received the negative selection notification still needs to receive video and/or audio data transmissions from the negatively selected EP, the process ends here. If however, the EP that received the negative selection notification is not the negatively selected EP and the EP that received the negative selection notification does not need to receive video and/or audio data transmissions from the negatively selected EP, the EP that received the negative selection notification sends a new negative selection notification to the EP that transmits data originating from the negatively selected EP to it (step 715). In addition to sending the new negative selection notification, the EP that received the negative selection notification may be configured to change its listening configurations (step 720), as listening to the IP address and port number through which data originating from the negatively selected EP is received from may be unnecessary.

Looking for example at FIG. 1C, assuming that EP 112C is receiving data originating from EP 117C from EP 116C while utilizing the multi-cast protocol for that purpose, that EP 116C receives data from EP 117C using the uni-cast protocol, and that the user of EP 112C issues a negative selection notification in respect of EP 117C. EP 112C will notify EP 116C, from which data originating from EP 117C is received by it, of the negative selection notification, and stop listening to the multi-cast IP address and port number through which he received data originating from EP 117C from. EP 116C in response to receiving the negative selection notification will update its transmission matrix to indicate that it is no longer transmitting data originating from EP 117C to EP 112C. in addition, EP 116C will decrease the MC counter indicating that it is transmitting data originating from EP 117C using the multi-cast protocol in the connectivity matrix by 1 (if the data originating from the negatively selected EP was sent using the uni-cast protocol—the uni-cast counter would have been decreased by 1). Following the update to the connectivity matrix, EP 116C distributes the update using the connectivity distribution method. If following the decrease, no counter became zeroed, a calculation of video transmission resolution will be performed since a change in the resolution may be advantageous (if, for example, the disconnecting EP received the video transmission in a higher resolution than other EPs did—the transmitting EP can now reduce the video frame resolution according to the new highest required resolution, thus saving bandwidth). If however, a multi-cast or uni-cast counter became zeroed, EP 116C will stop any transmission of data originating from EP 117C utilizing the uni-cast or multi-cast protocol respectively. If following the counter decrease, EP 116C is no longer transmitting data originating from EP 117C to any other EP, and no indication exists that EP 116C has positively selected to receive data from EP 117C exists, EP 116C sends a new negative selection notification from it to EP 117C. EP 117C in response to receiving the negative selection notification will update its transmission matrix to indicate that it is no longer transmitting data originating from it to EP 116C. In addition, EP 117C will decrease the UC counter indicating that it is transmitting data originating from it using the uni-cast protocol in the connectivity matrix by 1 (if the data originating from the negatively selected EP was sent using the multi-cast protocol—the multi-cast counter would have been decreased by 1). Following the update to the connectivity matrix, EP 117C distributes the update using the connectivity distribution method. If following the decrease, no counter became zeroed, a calculation of video transmission resolution will be performed since a change in the resolution may be advantageous (if, for example, the disconnecting EP received the video transmission in a higher resolution than other EPs did—the transmitting EP can now reduce the video frame resolution according to the new highest required resolution, thus saving bandwidth). If however, a multi-cast or uni-cast counter became zeroed, EP 117C will stop any transmission of data originating from it utilizing the uni-cast or multi-cast protocol respectively and the process will end.

Note that the invention is not bound by the operational steps of FIG. 7.

Figure 8:
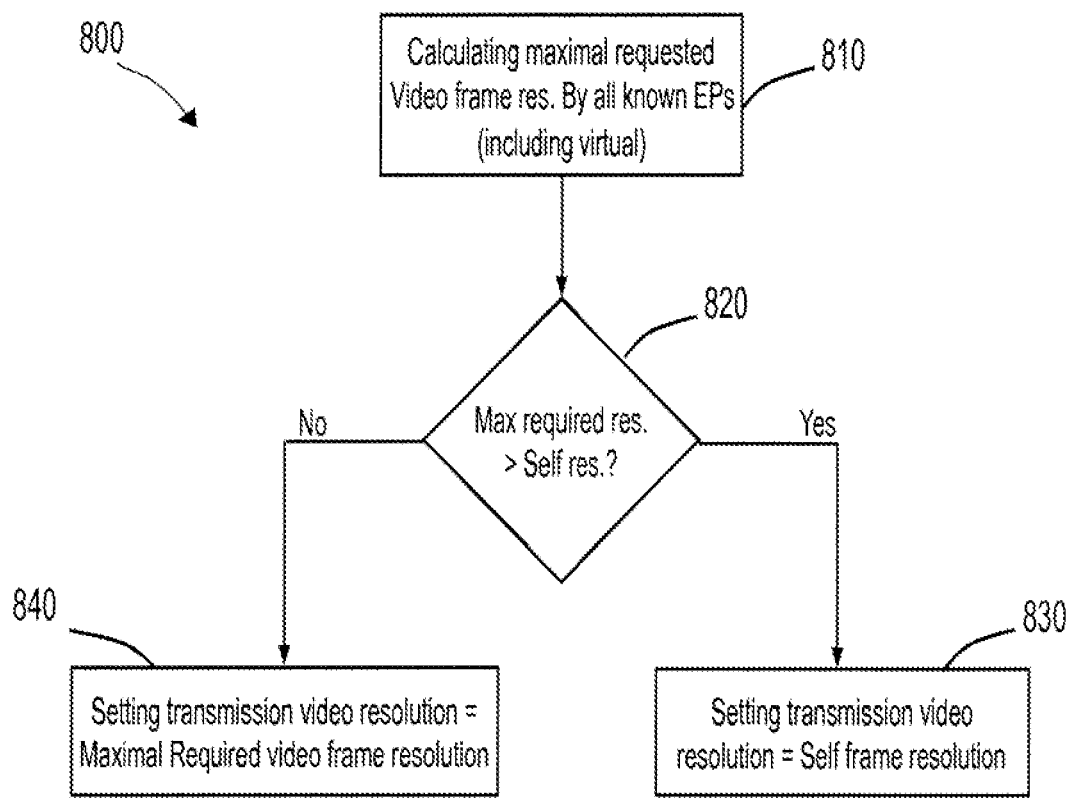
FIG. 8 is a flowchart illustrating a sequence of operations of a process for calculating required transmission video frame resolution, in accordance with certain embodiments of the invention.

FIG. 8 is a flowchart illustrating a sequence of operations of a process for calculating required transmission video frame resolution, in accordance with certain embodiments of the invention. As described above, each end-point maintains a connectivity list. The connectivity list further contains, inter alia, data indicative of the transmitting data capabilities of each EP. The transmitting data capabilities may include, inter alia, information of the frame rate (153), bit rate (152), video frame resolution (155), codec type (154), etc.

In addition, the connectivity list contains data of the required video frame resolution each EP wants to receive from the EP that maintains the connectivity list. Assuming, for example, that the connectivity list in FIG. 1D is maintained by EP 112C, and assuming that EP 117C positively selected to receive video transmission from EP 112C, when positively selecting to receive video transmission from EP 112C, EP 117C also notified EP 112C that he wants to receive the video data in a specific resolution, in this example: RVFR1 (see column 160 of FIG. 1D). Such requested video frame resolution may depend, for example, on a certain screen layout that a certain EP user selected.

In certain embodiments, when an EP is requested to transmit video data to at least one EP (i.e. at least one other EP wants to receive video transmission from it), the EP may be configured to initiate process 800 and calculate the maximal video frame resolution requested by any other EPs as indicated by the connectivity list (step 810). The EP may be further configured to compare the calculated maximal video frame resolution requested by any other EPs to its own video frame resolution (step 820). In case the maximal video frame resolution requested by any other EPs is greater than its own video frame resolution, the transmission video resolution will be set to be its own video frame resolution (for example in cases where it is unable to transmit in a better video frame resolution than its own video frame resolution) (step 830). In case its own video frame resolution is greater than the maximal video frame resolution requested by any other EPs, the transmission video resolution will be set to be the maximal video frame resolution requested by any other EPs (step 840), thus, inter alia, reducing loads on the network.

Note that the invention is not bound by the operational steps of FIG. 8.

Figure 9:
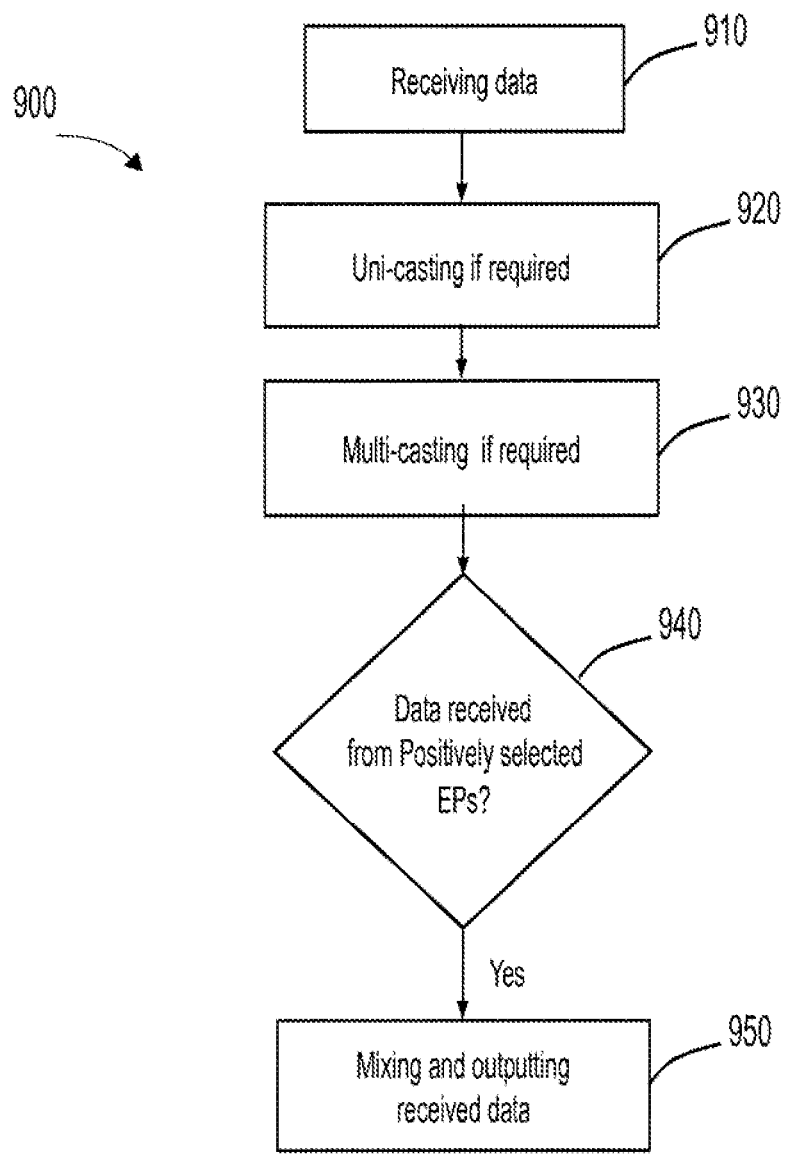
FIG. 9 is a flowchart illustrating a sequence of operations of a process for receiving data by a transmitting end-point during a data-conference, in accordance with certain embodiments of the invention.

Turning now to FIG. 9, it illustrates a flowchart of a sequence of operations of a process for receiving data by a transmitting end-point during a data-conference, in accordance with certain embodiments of the invention. In certain embodiments, when data is received by an EP (step 910), the EP is configured to check the transmission matrix to see if any EPs are to receive the data transmissions, which originated from a certain EP, from the receiving EP using the uni-cast protocol. If such EPs exist, the receiving EP is configured to transmit the received data to those EPs using the uni-cast protocol (step 920). For that purpose, the receiving EP may utilize the IP address of the EPs that are to receive the data transmissions saved as part of the connectivity list (column 151). Looking at FIG. 1C, assuming that EP 112C positively selected to receive data originating from EP 117C, and that for some reason EP 112C cannot receive data originating from EP 117C using the multi-cast protocol (thus, the data is to be transmitted to EP 112C from EP 116C using the uni-cast protocol), the transmission matrix of EP 116C will include an indication that it is to transmit data originating from EP 117C to EP 112C using the uni-cast protocol. Looking at FIG. 1F, such an indication can be seen in the intersection of the "UC?" column of EP 112C, and the row of EP 117C, indicating "yes", meaning that data received from EP 117C is to be transmitted using the uni-cast protocol to EP 112C. Thus, when data originating from EP 117C is received by EP 116C, EP 116C will transmit the received data to EP 112C using the uni-cast protocol.

Following receipt of data, the EP is further configured to check the transmission matrix to see if at least one EP is to receive the data transmissions, which originated from a certain EP, from the receiving EP using the multi-cast protocol. If such EP(s) exist, the receiving EP is configured to transmit the received data using the multi-cast protocol utilizing the multi-cast IP address and port number saved in the connectivity matrix with respect of the EP from which the received data originated from (step 930). Looking at FIG. 1C, assuming that EP 112C positively selected to receive data originating from EP 117C, and that EP 112C cannot receive data originating from EP 117C directly using the multi-cast protocol, but can receive the data from EP 116C using the multi-cast protocol (thus, the data is to be by EP 116C using the multi-cast protocol), the transmission matrix of EP 116C will include an indication that it is to transmit data originating from EP 117C to EP 112C using the multi-cast protocol. Looking at FIG. 1F, such an indication can be seen in the intersection of the "MC?" column of EP 112C, and the row of EP 117C, indicating "yes", meaning that data received from EP 117C is to be transmitted using the multi-cast protocol at least to EP 112C. Thus, when data originating from EP 117C is received by EP 116C, EP 116C will transmit the received data using the multi-cast protocol.

It is to be noted that other methods of checking if the receiving EP is to transmit data originating from a certain EP exist, for example querying the uni-cast counter and the multi-cast counter saved as part of the connectivity matrix (UC and MC counters, columns 172, 173 in FIG. 1E respectively).

It is further inquired, by the receiving EP, whether received data originated from an EP which was positively selected by the receiving EP (step 940). If the data is received from a positively selected EP (step 745) (i.e. EP which received positive selection notification from the receiving EP) then the specified data will be mixed and outputted (e.g. displayed and/or sent to audio device such as speaker(s)) (step 950).

Note that the invention is not bound by the operational steps of FIG. 9.

Turning now to FIG. 10, it illustrates a flowchart of a sequence of operations of a process for disconnecting from a data-conference, in accordance with certain embodiments of the invention. In certain embodiments, process 1000 begins when a notification of a user's disconnection is received by an EP (either directly as the disconnection is originated by the same EP user or indirectly as the disconnection is received from another EP distributing the disconnection notification received from another EP user) (step 1005). The receiving EP is configured to check if the disconnection notification originated from its own user (step 1010). If the disconnection notification originated from the receiving EP user, the EP is configured to distribute the received disconnection notification to all of its associated non-virtual EPs (step 1015), to stop all data transmissions (step 1020) and to stop listening to all data transmissions (e.g. closing all listening ports) (step 1025).

If the disconnection notification did not originate from the receiving EP user, the receiving EP is configured to stop listening to all data transmissions originating from the disconnecting EP and to all data transmissions originating from its associated EPs (e.g. close all listening ports associated with the disconnecting EP or its associated EPs) (step 1027). The receiving EP is further configured to distribute the received disconnection notification to all non-virtual EPs connected to it, and in addition, to issue a disconnection notification regarding every EP that is associated with the EP from which the disconnection notification originated from (step 1030). Data regarding the EPs that are associated with the EP from which the disconnection notification originated can be retrieved from the connectivity list (column 157, entitled "associated with").

Following distribution of the disconnection notification(s), the receiving EP is further configured to update the connectivity list, the connectivity matrix and the transmission matrix according to the received disconnection notification and to distribute the updates to the connectivity list and to the connectivity matrix using, for example, the connectivity distribution method (step 1035). Such updates include, inter alia, deleting the rows and columns relating to the disconnecting EP and to its associated EPs. Before such deletions, the receiving EP checks the transmission matrix to see if it is transmitting any data to the disconnecting EP or to its associated EPs using the uni-cast protocol or the multi-cast protocol. If so—it stops any such transmissions and updates the connectivity matrix accordingly (by decreasing the relevant counter by 1). Following the update to the connectivity matrix, the EP is configured to check if any counter became zeroed and thus transmission of data originating from the EP of which counter became zeroed is to be stopped (step 1040). If no counter became zeroed, a calculation of the required video frame resolution is performed, as further detailed with reference to FIG. 8 (step 1045). If however, any counter became zeroed, the EP that received the disconnection notification stops any transmission of data originating from the EP for which the counter became zeroed using the uni-cast protocol or the multi-cast protocol, accordingly (step 1050). The specified counter became zeroed is indicative of the fact that no EP is to receive data originating from the EP for which the counter became zeroed from the EP that received the disconnection notification utilizing either the uni-cast protocol (in case a UC counter became zeroed) or the multi-cast protocol (in case a MC counter became zeroed). The EP that received the disconnection notification is further configured to check if it is not the EP from which the data originates and if the data from the EP from which data originates is not required by its user (step 1055). If the EP that received the disconnection notification is the EP from which the data originates, the process ends. If however, the EP that received the disconnection notification is not the EP from which the data originated, the EP that received the disconnection notification is configured to check if there is a need for it to continue receiving data transmissions originating from the EP from which the data originates. Such a need exists if the EP that received the disconnection notification still transmits data originating from the EP from which the data originates to at least one other EP, or, if the user of the EP that received the disconnection notification itself chose to receive video and/or audio data transmissions originating from the EP from which the data originates. If the EP that received the disconnection notification still needs to receive video and/or audio data transmissions originating from the EP from which the data originates, the process ends here. If however, the EP that received the disconnection notification is not the EP from which the data originates and the EP that received the disconnection notification does not need to receive video and/or audio data transmissions originating from the EP from which the data originates, the EP that received the disconnection notification sends a negative selection notification to the EP that transmits data originating from the EP from which the data originates to it (step 1060). In addition to sending the new negative selection notification, the EP that received the disconnection notification may be configured to change its listening configurations (step 1065), as listening to the IP address and port number through which data originating from the disconnecting EP is received from may be unnecessary.

Looking back at cluster 119C in FIG. 1C, one may assume that the user of EP 116C chooses to disconnect from the conference. A disconnection notification will be received by EP 116C, that will send the disconnection notification to its non-virtual EPs, 112C and 117C. EP 117C has no non-virtual EPs to distribute the disconnection notification to. EP 112C will send the disconnection notification to its non-virtual EP 115C, along with a disconnection notification from all EPs associated with EP 116C, in this example, EP 117C. Each receiving EP will remove the disconnecting EP and all of its associated EPs (according to the connectivity list, column 162) from its connectivity list, connectivity matrix and transmission matrix. Following removal of the disconnecting EP and all of its associated EPs, the relevant changes in transmission and listening definitions will be performed (if any such changes are required).

It is to be noted that in some embodiments a receiving EP may also be configured to receive a disconnection notification indicating that the receiving EP is to be disconnected from other EP users selections (for example if an EP user is able to choose to remotely disconnect other EPs, etc.).

Note that the various sequence of operations described with reference to FIGS. 1A, 3-10 is executed by a given EP, it can be executed by any EP, that wishes, e.g. in response to a user command to participate as a receiving and/or transmitting EP. Thus, in accordance with certain embodiments the conferencing system and/or method is decentralized and scalable.

While the invention has been shown and described with respect to particular embodiments, it is not thus limited. Numerous modifications, changes and improvements within the scope of the invention will now occur to the reader.

What is claimed is:

1. An apparatus for use in a multi end-point (EP) conferencing system, comprising a source EP configured to:
   transmit a source conference list to a non-virtual target EP, the source conference list for distribution to other EPs associated with the non-virtual target EP;

receive a received conference list from the non-virtual target EP;
integrate the received conference list with the source conference list to produce an integrated conference list;
distribute at least a part of the integrated conference list to the other EPs;
receive at least one positive selection notification indicative of one or more requesting EPs from the integrated conference list that would like to exchange conferencing data with the source EP; and
receive conferencing data originating from the one or more requesting EPs including utilizing the integrated conference list to identify at least one transmitting EP using a multi-cast protocol.

2. The apparatus of claim 1, wherein the source EP is further configured to mix and output the conferencing data originating from the one or more requesting EPs to at least one other EP in the multi EP conferencing system.

3. The apparatus of claim 1, wherein at least one of the one or more requesting EPs comprises a virtual EP.

4. The apparatus of claim 1, wherein the source EP is further configured to transmit conferencing data for receipt by the one or more requesting EPs responsive to receiving the at least one positive selection notification.

5. The apparatus of claim 4, wherein at least one of the transmitted conferencing data and the received conferencing data includes at least one of video and audio data.

6. The apparatus of claim 1, wherein:
the integrated conference list includes data indicative of all of the one or more requesting EPs and for each of the requesting EPs, the integrated conference list further includes indication of requested transmitting data characteristics; and
the source EP is further configured to transmit conferencing data configured with the requested transmitting data characteristics.

7. The apparatus of claim 6, wherein the transmitted conferencing data includes video data and wherein the requested transmitting data characteristics include requested video frame resolution and wherein the video data is transmitted in a video frame resolution that complies with the following:
transmitted video frame resolution =(Min (video frame resolution of the source EP video data, Max (video frame resolution requested by any of the one or more requesting EPs)).

8. The apparatus of claim 1, wherein the source EP is further configured to test an ability of the non-virtual target EP to communicate using the multi-cast protocol.

9. The apparatus of claim 1, wherein the source EP is further configured to halt communication with a first EP following receipt of a disconnection notification or a negative selection notification associated with the first EP if no other EP associated with the source EP is to receive data that originates from the first EP.

10. A multi end-point (EP) conferencing system, comprising:
a decentralized scalable network of EPs comprising a source EP being configured to connect to a non-virtual target EP;
wherein the source EP is configured to:
receive a received conference list of the non-virtual target EP;
integrate the received conference list with a source conference list on the source EP to obtain an integrated conference list;
distribute the integrated conference list or parts thereof to other EPs associated with the source EP;
identifying one or more requesting EPs from the integrated conference list that would like to exchange conferencing data with the source EP as positively selected EPs responsive to receiving at least one positive selection notification from one or more requesting EPs;
utilizing the integrated conference list for identifying at least one EP transmitting conferencing data using a multi-cast protocol, wherein the transmitted conferencing data originates the positively selected EPs; and
mix and output the transmitted conferencing data as output data to the other EPs associated with the source EP as part of the decentralized scalable network of EPs.

11. The multi end-point (EP) conferencing system of claim 10, wherein the source EP is further configured to utilize the integrated conference list for selecting an EP from among a group of identified EPs identified as associated with the source EP utilizing a criterion of number of EPs receiving the output data from the group of identified EPs, such that the selected EP has the largest number of EPs receiving the output data.

12. The multi end-point (EP) conferencing system of claim 10, wherein the source EP is further configured to:
utilize the integrated conference list to identify a non-virtual EP that at least one of the positively
selected EPs is associated with, and transmitting to the non-virtual EP a positive selection notification for distributing to the positively selected EPs;
receive conferencing data originating from the positively selected EPs; and
mix and output the received conferencing data originating from the positively selected EPs.

13. The multi end-point (EP) conferencing system of claim 12, wherein the source EP is further configured to receive at least one multi-cast IP address and port number of the positively selected EPs and receive data from other EP nodes using the multi-cast IP address and port number.

14. The multi end-point (EP) conferencing system of claim 10, wherein the source EP is further configured to receive conferencing data using a uni-cast protocol from a non-virtual EP, wherein the conferencing data originated from the positively selected EPs.

15. A method for communicating data, comprising:
transmitting a source conference list from a source EP to a non-virtual target EP, the source conference list for distribution to other EPs associated with the non-virtual target EP;
receiving a received conference list of the non-virtual target EP;
integrating the received conference list with the source conference list to produce an integrated conference list;
distributing at least a part of the integrated conference list to the other EPs;
receiving at least one positive selection notification indicative of one or more requesting EPs from the integrated conference list that would like to exchange conferencing data with the source EP;
receiving conferencing data originating from the one or more requesting EPs including utilizing the integrated conference list to identify at least one transmitting EP using a multi-cast protocol; and
mixing and output the received conferencing data originating from the at least one requesting EP as output data to at least one other EP in the multi EP conferencing system.

16. The method of claim 15, wherein at least one of the one or more requesting EPs comprises a virtual EP.

17. The method of claim 15, further comprising transmitting conferencing data for receipt by the one or more requesting EPs responsive to receiving the at least one positive selection notification.

18. The method of claim 17, wherein at least one of the transmitted conferencing data and the received conferencing data includes at least one of video and audio data.

19. The method of claim 15, wherein the integrated conference list includes data indicative of all of the one or more requesting EPs and for each of the requesting EPs the integrated conference list further includes indication of requested transmitting data characteristics and further comprising transmitting conferencing data configured with the requested transmitting data characteristics.

20. The method of claim 19, wherein the transmitted conferencing data includes video data and wherein the requested transmitting data characteristics include requested video frame resolution and wherein the video data is transmitted in a video frame resolution that complies with the following: transmitted video frame resolution =(Min (video frame resolution of the source EP video data, Max (video frame resolution requested by any of the one or more requesting EPs)).

21. The method of claim 15, further comprising testing an ability of the non-virtual target EP to communicate using the multi-cast protocol.

22. The method of claim 15, further comprising halting communication with a first EP following receipt of a disconnection notification or a negative selection notification associated with the first EP if no other EP associated with the source EP is to receive data that originates from the first EP.

23. A method for communicating data, comprising:
   receiving a received conference list of a non-virtual target EP at a source EP;
   integrating the received conference list with a source conference list on the source EP to obtain an integrated conference list;
   distributing the integrated conference list, or parts thereof, to other EPs associated with the source EP;
   receiving at least one positive selection notification indicative of one or more requesting EPs from the integrated conference list that would like to exchange conferencing data with the source EP;
   identifying one or more positively selected EPs responsive to the received at least one positive selection notification;
   utilizing the integrated conference list for identifying at least one EP transmitting conferencing data using a multi-cast protocol, wherein the transmitted data originates from at least one of the one or more positively selected EPs; and
   mixing and outputting the transmitted conferencing data as output data to the other EPs associated with the source EP as part of a decentralized scalable network of EPs.

24. The method of claim 23 further comprising utilizing the integrated conference list for selecting an EP from among a group of identified EPs identified as associated with the source EP utilizing a criterion of number of EPs receiving the output data from the group of identified EPs, such that the selected EP has the largest number of EPs receiving the output data.

25. The method of claim 23, further comprising:
   utilizing the integrated conference list to identify a non-virtual EP that the one or more positively selected EPs is associated with, and transmitting to the non-virtual EP a positive selection notification for distributing to the one or more positively selected EPs;
   receiving conferencing data originating from the one or more positively selected EPs; and
   mixing and outputting the received conferencing data originating from the one or more positively selected EPs.

26. The method of claim 25, further comprising receiving at least one multi-cast IP address and port number of the one or more positively selected EPs and receive data from other EP nodes using the multi-cast IP address and port number.

27. The method of claim 23, further comprising receiving the conferencing data using a uni-cast protocol from a non-virtual EP, wherein the conferencing data originated from the one or more positively selected EPs.

* * * * *